US008877881B2

(12) United States Patent
Giesbrecht

(10) Patent No.: US 8,877,881 B2
(45) Date of Patent: Nov. 4, 2014

(54) CATALYST COMPOUNDS AND USE THEREOF

(75) Inventor: Garth R. Giesbrecht, The Woodlands, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 218 days.

(21) Appl. No.: 13/301,910

(22) Filed: Nov. 22, 2011

(65) Prior Publication Data

US 2013/0131295 A1 May 23, 2013

(51) Int. Cl.
*C08F 4/76* (2006.01)
*C08F 4/64* (2006.01)
*C08F 4/52* (2006.01)

(52) U.S. Cl.
USPC ........... 526/172; 526/161; 526/134; 526/348; 526/352

(58) Field of Classification Search
USPC ............................ 526/172, 161, 352; 556/51
See application file for complete search history.

(56) References Cited

U.S. PATENT DOCUMENTS

| | | | | |
|---|---|---|---|---|
| 5,502,128 | A | 3/1996 | Flores et al. | |
| 6,090,739 | A * | 7/2000 | Riedel et al. | 502/103 |
| 6,239,239 | B1 | 5/2001 | Liu | |
| 2004/0147389 | A1 | 7/2004 | Green et al. | |

FOREIGN PATENT DOCUMENTS

| | | | | |
|---|---|---|---|---|
| CN | 101812094 A * | 8/2010 | | C07F 17/00 |
| WO | WO 00/20427 | 4/2000 | | |
| WO | WO 01/10875 | 2/2001 | | |
| WO | WO 03/054038 | 7/2003 | | |

OTHER PUBLICATIONS

Liu et al. Organometallics 2010, 29, 2459-2464.*

Li et al., "*Amidate Complexes of Titanium and Zirconium: A New Class of Tunable Precatalysts for the Hydroamination of Alkynes*", Chem. Commun., 2003, Issue 19, pp. 2462-2463.

Fernandes et al., "*Rapid Report: Polymerisation of Ethlyene Catalysed by Mono-imine-2,6-diacetylpyridine Iron/ Methylaluminoxane (MAO) Catalyst System: Effect of the Ligand on Polymer Microstructure*", Polymer International, 2002, vol. 51, pp. 1301-1303.

Keypour et al., "*Isolation of Ternary Complex Precursors and Partially Condensed Intermediates to Macrocyclic Complexes of Nickel* (II) *and Copper* (II)", Transition Metal Chemistry, 1998, vol. 23, pp. 609-613.

Luks et al., "*The Template Synthesis and Characterization of New Mono- and Dinuclear Podand Schiff Base Complexes of Scandium Group Elements*", Collection of Czechoslovak Chemical Communications, 1998, vol. 63, pp. 371-377.

Liu et al., "*Synthese, Characterizations, and Ethylene* (*Co-*) *Polymerization Screening of Amidate Half-Titanocene Dichlorides*", Organometallics, 2010, vol. 29, No. 11, pp. 2459-2464

Takashiina et al., "*Syntheses of Group 4 Transition Metal Complexes Bearing 2-pyridinethiolate Ligands and Their Catalytic Activities for Ethylene Polymerization*", Polymer, 2006, vol. 47, No. 16, pp. 5762-5774.

Zhang et al., "*Anti-Markovnikov Intermolecular Hydroamination: A Bis*(*amidate*) *Titanium Precatalyst for the Preparation of Reactive Aldimines*", Organic Letters, 2003, vol. 5, No. 24, pp. 4733-4736.

Ayinla, R.O. et al, "*Bis*(*amidate*) *titanium precatalyst for the intermolecular hydroamination of allenes*", Inorg. Chim Acta, 359 (2006) pp. 3097-3102.

Li, C. et al, "*Amidate Complexes of Titanium and Zirconium: A New Class of Tunable Precatalysts for the Hydroamination of Alkynes*", Chem. Commun. (2003) pp. 2462-2463.

Thomson, R.K. et al, "*Structure, Bonding, and Reactivity of Ti and Zr Amidate Complexes: DFT and X-Ray Crystallographic Studies*", Inorg, Chem. (2005) 44, pp. 8680-8689.

Thomson, R.K. et al, "*A Pentagonal Pyramidal Zirconium Imido Complex for Catalytic Hydroamination of Unactivated Alkenes*", J. Am. Chem. Soc. (Organometallics) (2006) 25, pp. 4069-4071.

* cited by examiner

*Primary Examiner* — Rip A. Lee
(74) *Attorney, Agent, or Firm* — Catherine L. Bell

(57) ABSTRACT

This invention relates to Group 4 catalyst compounds containing anionic bidentate nitrogen/oxygen based ligands catalyst compounds useful for polymerization and or oligomerization of unsaturated monomers. The catalyst compounds are particularly useful, with or without activators, to polymerize olefins, particularly α-olefins, or other unsaturated monomers.

48 Claims, No Drawings

CATALYST COMPOUNDS AND USE THEREOF

FIELD

This invention relates to catalyst compounds useful for polymerization and/or oligomerization of unsaturated monomers, such as olefins.

BACKGROUND

As is well known, various processes and catalysts exist for the homopolymerization or copolymerization of olefins. New polymerization catalysts are of interest in the industry because they offer many new opportunities for providing new processes and products to the markets in a cheaper and more efficient manner.

References of general interest related to the instant invention include: WO 2000/020427; WO 2001/010875; WO 2003/054038; *Polymer International,* 2002, 51, 1301-1303; *Collection of Czechoslovak Chemical Communications,* 1988, 63, 371-377; and *Transition Metal Chemistry,* 1988, 23, 609-613.

There is a need, therefore, for new polymerization technology, catalysts and products produced therefrom that are based on new transition metal catalyst compounds.

SUMMARY OF THE INVENTION

Group 4 catalyst compounds containing anionic bidentate nitrogen/oxygen based ligands are provided. The catalyst compounds are useful, with or without activators, to polymerize olefins, particularly α-olefins, or other unsaturated monomers. Systems and processes to oligomerize and/or polymerize one or more unsaturated monomers olefins using the catalyst compound, as well as the oligomers and/or polymers produced therefrom are also provided. For the purposes of this disclosure, "α-olefins" includes ethylene.

The catalyst compounds can be represented by the following structure:

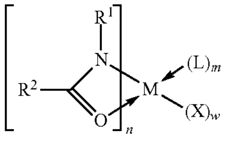

wherein M is a Group 4 transition metal (Ti, Zr, or Hf);

N is nitrogen;

O is oxygen;

each X is, independently, a hydride, a halogen, a hydrocarbyl, a substituted hydrocarbyl, a halocarbyl, or a substituted halocarbyl;

w is 1, 2, or 3;

X may be independently selected from halogen, alkoxide, aryloxide, amide, phosphide, or other anionic ligand when Lewis-acid activators (such as methylalumoxane, aluminum alkyls, alkylaluminum alkoxides) or alkylaluminum halides (capable of donating a hydride, hydrocarbyl, substituted hydrocarbyl, halocarbyl or substituted halocarbyl X ligand to the transition metal component) are used, or when an ionic activator is capable of extracting X, provided that the resulting activated catalyst contains at least one M-H or M-C bond into which an olefin can insert;

each $R^1$ and $R^2$ is, independently, a hydrogen, a hydrocarbyl, a substituted hydrocarbyl, a halocarbyl, or a substituted halocarbyl, preferably, a $C_1$ to $C_{30}$ hydrocarbyl, a $C_1$ to $C_{30}$ substituted hydrocarbyl, a $C_1$ to $C_{30}$ halocarbyl, or a $C_1$ to $C_{30}$ substituted halocarbyl, more preferably a $C_1$ to $C_{10}$ hydrocarbyl, a $C_1$ to $C_{10}$ substituted hydrocarbyl, a $C_1$ to $C_{10}$ halocarbyl, or a $C_1$ to $C_{10}$ substituted halocarbyl, a halogen, an alkoxide, a sulfide, an amide, a phosphide, a silyl or another anionic heteroatom-containing group; or independently, may join together to form a $C_4$ to $C_{62}$ cyclic or polycyclic ring structure;

n is 1, 2, or 3 such that w+n=4;

additionally in the case where n>1, the ligands (in this case the organic fragment containing $R^1$, $R^2$, N, and O) may be linked together to form a potentially tetradentate, dianionic ligand;

L is a neutral ligand bonded to M that may include molecules, such as but not limited to pyridine, acetonitrile, diethyl ether, tetrahydrofuran, dimethylaniline, trimethylamine, tributylamine, trimethylphosphine, triphenylphosphine, lithium chloride, ethylene, propylene, butene, octene, styrene, and the like; and m is 0, 1, or 2 and indicates the absence or presence of L, provided that when $R^2$ is t-butyl, then $R^1$ may not be 2,6-dimethylphenyl and X may not be Cl.

DEFINITIONS

In the structures depicted throughout this specification and the claims, a solid line indicates a bond, and an arrow indicates that the bond may be dative.

As used herein, the new notation for the Periodic Table Groups is used as described in CHEMICAL AND ENGINEERING NEWS, 63(5), 27 (1985).

Neutral ligands are defined as ligands that are neutral, with respect to charge, when formally removed from the metal in their closed shell electronic state. Neutral ligands contain at least one lone pair of electrons, pi-bond or sigma bond that are capable of binding to the transition metal. Neutral ligands may also be polydentate when more than one Neutral ligand is connected via a bond or a hydrocarbyl, substituted hydrocarbyl or a functional group tether. A Neutral ligand may be a substituent of another metal complex, either the same or different, such that multiple complexes are bound together.

Anionic ligands are defined as ligands that are anionic, with respect to charge, when formally removed from the metal in their closed shell electronic state. Anionic ligands include hydride, halide, hydrocarbyl, substituted hydrocarbyl or functional group. Non-limiting examples of anionic ligands include hydride, fluoride, chloride, bromide, iodide, alkyl, aryl, alkenyl, alkynyl, allyl, benzyl, acyl, and trimethylsilyl. Anionic ligands may also be polydentate when more than one anionic ligand is connected via a bond or a hydrocarbyl, substituted hydrocarbyl or a functional group tether. An anionic ligand may be a substituent of another metal complex, either the same or different, such that multiple complexes are bound together. A mono-anionic ligand is defined to be an anionic ligand that has a−1 charge. A di-anionic ligand is defined to be an anionic ligand that has a −2 charge.

The terms "hydrocarbyl radical," "hydrocarbyl" and hydrocarbyl group" are used interchangeably throughout this document. Likewise the terms "group" and "substituent" are also used interchangeably in this document. For purposes of this disclosure, "hydrocarbyl radical" is defined to be $C_1$ to $C_{100}$ radicals, that may be linear, branched, or cyclic, and when cyclic, aromatic or non-aromatic, and include substituted hydrocarbyl radicals, halocarbyl radicals, and substituted halocarbyl radicals, silylcarbyl radicals, and germylcarbyl radicals as these terms are defined below.

Substituted hydrocarbyl radicals are radicals in which at least one hydrogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like or where at least one non-hydrocarbon atom or group has been inserted within the hydrocarbyl radical, such as O, S, Se, Te, $NR^*$, $PR^*$, $AsR^*$, $SbR^*$, $BR^*$, $SiR^*_2$, $GeR^*_2$, $SnR^*_2$, $PbR^*_2$, and the like, where R* is independently a hydrocarbyl or halocarbyl radical.

Halocarbyl radicals are radicals in which one or more hydrocarbyl hydrogen atoms have been substituted with at least one halogen (e.g., F, Cl, Br, I) or halogen-containing group (e.g., $CF_3$).

Substituted halocarbyl radicals are radicals in which at least one halocarbyl hydrogen or halogen atom has been substituted with at least one functional group, such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like or where at least one non-carbon atom or group has been inserted within the halocarbyl radical such as O, S, Se, Te, $NR^*$, $PR^*$, $AsR^*$, $SbR^*$, $BR^*$, $SiR^*_2$, $GeR^*_2$, $SnR^*_2$, $PbR^*_2$, and the like where R* is independently a hydrocarbyl or halocarbyl radical provided that at least one halogen atom remains on the original halocarbyl radical.

Silylcarbyl radicals (also called silylcarbyls) are groups in which the silyl functionality is bonded directly to the indicated atom or atoms. Examples include $SiH_3$, $SiH_2R^*$, $SiHR^*_2$, $SiR^*_3$, $SiH_2(OR^*)$, $SiH(OR^*)_2$, $Si(OR^*)_3$, $SiH_2(NR^*_2)$, $SiH(NR^*_2)_2$, $Si(NR^*_2)_3$, and the like where R* is independently a hydrocarbyl or halocarbyl radical as defined above and two or more R* may join together to form a substituted or unsubstituted saturated, partially unsaturated or aromatic cyclic or polycyclic ring structure.

Germylcarbyl radicals (also called germylcarbyls) are groups in which the germyl functionality is bonded directly to the indicated atom or atoms. Examples include $GeH_3$, $GeH_2R^*$, $GeHR^*_2$, $GeR^5_3$, $GeH_2(OR^*)$, $GeH(OR^*)_2$, $Ge(OR^*)_3$, $GeH_2(NR^*_2)$, $GeH(NR^*_2)_2$, $Ge(NR^*_2)_3$, and the like where R* is independently a hydrocarbyl or halocarbyl radical as defined above and two or more R* may join together to form a substituted or unsubstituted saturated, partially unsaturated or aromatic cyclic or polycyclic ring structure.

Polar radicals or polar groups are groups in which the heteroatom functionality is bonded directly to the indicated atom or atoms. They include heteroatoms of groups 1-17 of the periodic table either alone or connected to other elements by covalent or other interactions such as ionic, van der Waals forces, or hydrogen bonding. Examples of functional groups include carboxylic acid, acid halide, carboxylic ester, carboxylic salt, carboxylic anhydride, aldehyde and their chalcogen (Group 14) analogues, alcohol and phenol, ether, peroxide and hydroperoxide, carboxylic amide, hydrazide and imide, amidine and other nitrogen analogues of amides, nitrile, amine and imine, azo, nitro, other nitrogen compounds, sulfur acids, selenium acids, thiols, sulfides, sulfoxides, sulfones, phosphines, phosphates, other phosphorus compounds, silanes, boranes, borates, alanes, and aluminates. Functional groups may also be taken broadly to include organic polymer supports or inorganic support material such as alumina, and silica. Preferred examples of polar groups include $NR^*_2$, $OR^*$, $SeR^*$, $TeR^*$, $PR^*_2$, $AsR^*_2$, $SbR^*_2$, $SR^*$, $BR^*_2$, $SnR^*_3$, $PbR^*_3$, and the like where R* is independently a hydrocarbyl, substituted hydrocarbyl, halocarbyl or substituted halocarbyl radical as defined above and two R* may join together to form a substituted or unsubstituted saturated, partially unsaturated or aromatic cyclic or polycyclic ring structure.

In some embodiments, the hydrocarbyl radical is independently selected from methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl. Also included are isomers of saturated, partially unsaturated and aromatic cyclic structures wherein the radical may additionally be subjected to the types of substitutions described above. Examples include phenyl, methylphenyl, benzyl, methylbenzyl, naphthyl, cyclohexyl, cyclohexenyl, methylcyclohexyl, and the like. For this disclosure, when a radical is listed, it indicates that radical type and all other radicals formed when that radical type is subjected to the substitutions defined above. Alkyl, alkenyl, and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl and 2-methyl-2-propenyl (and cyclobutenyls and cyclopropenyls). Cyclic compound having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. The term "different" as used to refer to mer units indicates that the mer units differ from each other by at least one atom or are different isomerically.

Accordingly, the definition of copolymer, as used herein, includes terpolymers and the like. An oligomer is typically a polymer having a low molecular weight (such an Mn of less than 25,000 g/mol, preferably less than 2,500 g/mol) or a low number of mer units (such as 75 mer units or less). An ethylene polymer is an ethylene homopolymer polymer or a copolymer having more than 50 mol % ethylene, a propylene polymer is a propylene homopolymer or copolymer having more than 50% propylene, and so on. The terms "catalyst" and "catalyst compound" are defined to mean a compound capable of initiating catalysis. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor. The term "catalyst system" is defined to mean: 1) a catalyst precursor/activator pair and/or 2) a catalyst compound capable of initiating catalysis without an activator. When "catalyst system" is used to describe such a pair before activation, it means the unactivated catalyst (pre-catalyst) together with an activator and, optionally, a co-activator. When it is used to describe such a pair after activation, it means the activated catalyst and the activator or other charge-balancing moiety.

The catalyst compound may be neutral as in a pre-catalyst or a catalyst system not requiring an activator, or may be a charged species with a counter ion as in an activated catalyst system.

The terms "activator" and "cocatalyst" are used interchangeably herein. A scavenger is a compound that is typically added to facilitate oligomerization or polymerization by scavenging impurities. Some scavengers may also act as activators and may be referred to as co-activators. A co-activator, that is not a scavenger, may also be used in conjunction with an activator in order to form an active catalyst. In some embodiments, a co-activator can be pre-mixed with the catalyst compound to form an alkylated catalyst compound, also referred to as an alkylated invention compound.

DETAILED DESCRIPTION OF THE INVENTION

Group IV dialkyl compounds supported by bidentate amidate ligands are provided. Such compounds exhibit high activities for the polymerization of high molecular weight polyethylene. The catalyst compound can be represented by the following structure:

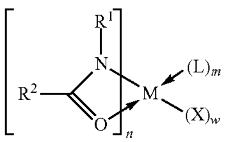

wherein M is a Group 4 transition metal (Ti, Zr, or Hf);

N is nitrogen;

O is oxygen;

each X is, independently, a hydride, a halogen, a hydrocarbyl, a substituted hydrocarbyl, a halocarbyl, or a substituted halocarbyl;

w is 1, 2, or 3;

X may be independently selected from halogen, alkoxide, aryloxide, amide, phosphide, or other anionic ligand when Lewis-acid activators (such as methylalumoxane, aluminum alkyls, alkylaluminum alkoxides) or alkylaluminum halides (capable of donating a hydride, hydrocarbyl, substituted hydrocarbyl, halocarbyl or substituted halocarbyl X ligand to the transition metal component) are used, or when an ionic activator is capable of extracting X, provided that the resulting activated catalyst contains at least one M-H or M-C bond into which an olefin can insert;

each $R^1$ and $R^2$ is, independently, a hydrogen, a hydrocarbyl, a substituted hydrocarbyl, a halocarbyl, or a substituted halocarbyl, preferably, a $C_1$ to $C_{30}$ hydrocarbyl, a $C_1$ to $C_{30}$ substituted hydrocarbyl, a $C_1$ to $C_{30}$ halocarbyl, or a $C_1$ to $C_{30}$ substituted halocarbyl, more preferably a $C_1$ to $C_{10}$ hydrocarbyl, a $C_1$ to $C_{10}$ substituted hydrocarbyl, a $C_1$ to $C_{10}$ halocarbyl, or a $C_1$ to $C_{10}$ substituted halocarbyl, a halogen, an alkoxide, a sulfide, an amide, a phosphide, a silyl or another anionic heteroatom-containing group; or independently, may join together to form a $C_4$ to $C_{62}$ cyclic or polycyclic ring structure;

n is 1, 2, or 3 such that w+n=4;

additionally in the case where n>1, the ligands (in this case the organic fragment containing $R^1$, $R^2$, N, and O) may be linked together to form a potentially tetradentate, dianionic ligand;

L is a neutral ligand bonded to M that may include molecules such as but not limited to pyridine, acetonitrile, diethyl ether, tetrahydrofuran, dimethylaniline, trimethylamine, tributylamine, trimethylphosphine, triphenylphosphine, lithium chloride, ethylene, propylene, butene, octene, styrene, and the like; and m is 0, 1, or 2 and indicates the absence or presence of L, provided that when $R^2$ is t-butyl, then $R^1$ is not 2,6-dimethylphenyl and X may not be Cl.

Alternately, when $R^1$ is phenyl or substituted alkyl, then $R^2$ is not a C1 to C4 alkyl.

Alternately, when $R^1$ is a substituted phenyl or adamantyl, then $R^2$ is not a C1 to C6 linear or branched alkyl.

Alternately when $R^2$ is t-butyl, then $R^1$ is not dimethyl phenyl and X is not Cl.

Alternately, when $R^2$ is t-butyl, then $R^1$ is not dimethyl phenyl and X is not halogen.

Alternately, when $R^2$ is t-butyl, then $R^1$ is not phenyl or substituted phenyl.

Substituted alkyls are alky groups in which at least one hydrogen atom has been substituted with at least one functional group such as a heteroatom or $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like or where at least one non-hydrocarbon atom or group has been inserted within the alkyl group, such as O, S, Se, Te, $NR^*$, $PR^*$, $AsR^*$, $SbR^*$, $BR^*$, $SiR^*_2$, $GeR^*_2$, $SnR^*_2$, $PbR^*_2$, and the like, where R* is independently hydrogen, a hydrocarbyl or halocarbyl radical.

Substituted phenyls are phenyl groups in which at least one hydrogen atom has been substituted with at least one functional group such as a heteroatom or $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like or where at least one non-hydrocarbon atom or group has been inserted within the phenyl group, such as O, S, Se, Te, $NR^*$, $PR^*$, $AsR^*$, $SbR^*$, $BR^*$, $SiR^*_2$, $GeR^*_2$, $SnR^*_2$, $PbR^*_2$, and the like, where R* is independently hydrogen, a hydrocarbyl or halocarbyl radical.

Specific embodiments of the catalyst compound can include any combination of the ligands listed in Table 1 below.

TABLE 1

| Specific ligand combinations | | | |
|---|---|---|---|
| $R^1$, $R^2$ | X | M | L |
| hydrogen | chloride | titanium | acetonitrile |
| methyl | bromide | hafnium | diethyl ether |
| ethyl | iodide | zirconium | tetrahydrofuran |
| propyl | methyl | | furan |
| butyl | ethyl | | thiofuran |
| pentyl | propyl | | chromane |
| hexyl | butyl | | isochromane |
| heptyl | pentyl | | thiochromane |
| octyl | hexyl | | thioisochromane |
| nonyl | heptyl | | quinuclidine |
| decyl | octyl | | benzofuran |
| undecyl | nonyl | | chromene |
| dodecyl | decyl | | isobenzofuran |
| tridecyl | undecyl | | isoquinoline |
| tetradecyl | dodecyl | | oxazole |
| octacosyl | tridecyl | | phenanthridine |
| nonacosyl | tetradecyl | | pyran |
| triacontyl | pentadecyl | | pyridine |
| cyclohexyl | hexadecyl | | quinoline |
| cyclopentyl | heptadecyl | | selenophene |
| cycloheptyl | octadecyl | | thiophene |
| cyclooctyl | nonadecyl | | trimethylamine |
| cyclodecyl | eicosyl | | triethylamine |
| cyclododecyl | heneicosyl | | tributylamine |
| naphthyl | docosyl | | dimethylaniline |
| phenyl | tricosyl | | trimethyl phosphine |
| tolyl | tetracosyl | | triphenyl phosphine |
| benzyl | pentacosyl | | ethylene |
| phenethyl | hexacosyl | | propylene |
| dimethylphenyl | heptacosyl | | butene |
| diethylphenyl | octacosyl | | hexene |
| anthracenyl | nonacosyl | | octene |
| adamantyl | triacontyl | | cyclohexene |
| norbornyl | hydride | | vinylcyclo hexene |
| $CF_3$ | phenyl | | benzene |
| $NO_2$ | benzyl | | styrene |
| t-butyl | phenethyl | | methylstyrene |
| i-propyl | tolyl | | |
| naphthyl | methoxy | | |
| fluoride | ethoxy | | |
| trimethylphenyl | propoxy | | |
| methylphenyl | butoxy | | |
| ethylphenyl | dimethylamido | | |
| diethylphenyl | diethylamido | | |
| triethylphenyl | methylethyl amido | | |
| propylphenyl | phenoxy | | |
| dipropylphenyl | benzoxy | | |
| diisopropyl phenyl | allyl | | |
| tripropylphenyl | trimethyl silylmethyl | | |
| isopropylphenyl | bis(trimethyl silyl)methyl | | |
| methylethyl phenyl | | | |
| dibutylphenyl | | | |
| butylphenyl | | | |
| pentafluorophenyl | | | |

Particularly useful catalyst compounds include when $R^1$=2,6-dimethylphenyl, $R^2$=tert-butyl, M=Zr and X=benzyl; when $R^1$=2,6-diisopropylphenyl, $R^2$=phenyl, M=Ti and X=chloro; when $R^1$=2,6-diisopropylphenyl, $R^2$=pentafluorophenyl, M=Ti and X=chloro; and when $R^1$=2,6-diisopropylphenyl, $R^2$=tert-butyl, M=Ti, and X=dimethylamido.

Activators and Catalyst Activation

The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

In one embodiment, alumoxane activators are utilized as an activator in the catalyst composition. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide, or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

When the activator is an alumoxane (modified or unmodified), some embodiments select the maximum amount of activator at a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mol %; alternately the alumoxane is present at a molar ratio of aluminum to catalyst compound transition metal less than 500:1, preferably less than 300:1, preferably less than 100:1, preferably less than 1:1.

In a preferred embodiment, the Lewis base modifier is present at a molar ratio of X in the Lewis base modifier (as described in the formulae above) to aluminum metal in the alumoxane compound (preferably methylalumoxane) of greater than 1:1, preferably from 1.5:1 to 1000:1, preferably from 2:1 to 500:1, preferably from 2.25:1 to 300:1, preferably from 3:1 to 100:1, preferably from 3.5:1 to 50:1, preferably from 4:1 to 40:1, preferably from 4:1 to 25:1, preferably from 5:1 to 20:1, preferably from 5:1 to 15:1, preferably from 5:1 to 10:1. (For purposes of calculating the moles of an alkylalumoxane, the alkylalumoxane shall be defined to have an Mw of 43.02 g/mol plus the Mw of the alkyl. For example, methylalumoxane has an Mw of 58.06 g/mol (43.02 g/mol+15.04 g/mol) and ethylalumoxane has an Mw of 72.08 g/mol (43.02+29.06 g/mol) and so on.)

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization.

It is within the scope of this invention to use an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators.

Examples of neutral stoichiometric activators include trisubstituted boron, tellurium, aluminum, gallium, and indium, or mixtures thereof. The three substituent groups are each independently selected from alkyls, alkenyls, halogens, substituted alkyls, aryls, arylhalides, alkoxy, and halides. Preferably, the three groups are independently selected from halogen, mono or multicyclic (including halosubstituted) aryls, alkyls, and alkenyl compounds, and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl, or mixtures thereof. Even more preferably, the three groups are halogenated, preferably fluorinated, aryl groups. A preferred neutral stoichiometric activator is tris perfluorophenyl boron or tris perfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in European publications EP 0 570 982 A; EP 0 520 732 A; EP 0 495 375 A; EP 0 500 944 B 1; EP 0 277 003 A; EP 0 277 004 A; U.S. Pat. Nos. 5,153,157; 5,198,401; 5,066,741; 5,206,197; 5,241,025; 5,384,299; 5,502,124; and U.S. patent application Ser. No. 08/285,380, filed Aug. 3, 1994; all of which are herein fully incorporated by reference.

Preferred compounds useful as an activator in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic, diolefinic and acetylenically unsaturated substrates or other neutral Lewis bases, such as ethers, amines, and the like. Two classes of useful compatible non-coordinating anions have been disclosed in EP 0 277 003 A1, and EP 0 277 004 A1:1) anionic coordination complexes comprising a plurality of lipophilic radicals covalently coordinated to and shielding a central charge-bearing metal or metalloid core and 2) anions comprising a plurality of boron atoms such as carboranes, metallacarboranes, and boranes.

In a preferred embodiment, the stoichiometric activators include a cation and an anion component, and are preferably represented by the following formula (II):

$$(Z)_d^+(A^{d-}) \quad \text{(II)}$$

wherein Z is (L-H) or a reducible Lewis Acid, L is a neutral Lewis base; H is hydrogen; $(L\text{-}H)^+$ is a Bronsted acid; $A^{d-}$ is a non-coordinating anion having the charge d−; and d is an integer from 1 to 3.

When Z is (L-H) such that the cation component is $(L\text{-}H)_d^+$, the cation component may include Bronsted acids such as protonated Lewis bases capable of protonating a moiety, such as an alkyl or aryl, from the bulky ligand metallocene containing transition metal catalyst precursor, resulting in a cationic transition metal species. Preferably, the activating cation $(L\text{-}H)_d^+$ is a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N, N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid it is preferably represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl, preferably the reducible Lewis acid is represented by the formula: $(Ph_3C^+)$, where Ph is phenyl or phenyl substituted with a heteroatom, a $C_1$ to $C_{40}$ hydrocarbyl, or a substituted $C_1$ to $C_{40}$ hydrocarbyl. In a preferred embodiment, the reducible Lewis acid is triphenyl carbenium.

The anion component $A^{d-}$ include those having the formula $[M^{k+}Q_n]^{d-}$ wherein k is 1, 2, or 3; n is 1, 2, 3, 4, 5, or 6, preferably 3, 4, 5, or 6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide, and two Q groups may form a ring structure. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ components also include diboron compounds as disclosed in U.S. Pat. No. 5,447,895, which is fully incorporated herein by reference.

In a preferred embodiment, this invention relates to a method to polymerize olefins comprising contacting olefins (preferably ethylene) with an amidinate catalyst compound, a chain transfer agent and a boron containing NCA activator represented by the formula (14):

$$Z_d^+(A^{d-}) \quad (14)$$

where: Z is (L-H) or a reducible Lewis acid; L is an neutral Lewis base (as further described above); H is hydrogen; (L-H) is a Bronsted acid (as further described above); $A^{d-}$ is a boron containing non-coordinating anion having the charge d (as further described above); d is 1, 2, or 3.

In a preferred embodiment in any NCA's represented by Formula 14 described above, the reducible Lewis acid is represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl, preferably the reducible Lewis acid is represented by the formula: $(Ph_3C^+)$, where Ph is phenyl or phenyl substituted with a heteroatom, a $C_1$ to $C_{40}$ hydrocarbyl, or a substituted $C_1$ to $C_{40}$ hydrocarbyl.

In a preferred embodiment in any of the NCA's represented by Formula 14 described above, $Z_d^+$ is represented by the formula: $(L\text{-}H)_d^+$, wherein L is an neutral Lewis base; H is hydrogen; (L-H) is a Bronsted acid; and d is 1, 2, or 3, preferably $(L\text{-}H)_d^+$ is a Bronsted acid selected from ammoniums, oxoniums, phosphoniums, silyliums, and mixtures thereof.

In a preferred embodiment in any of the NCA's represented by Formula 14 described above, the anion component $A^{d-}$ is represented by the formula $[M^{*k*+}Q^{*}_{n}{}^{*}]^{d*-}$ wherein k* is 1, 2, or 3; n* is 1, 2, 3, 4, 5, or 6 (preferably 1, 2, 3, or 4); n*−k*=d*; M* is boron; and Q* is independently selected from hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q* having up to 20 carbon atoms with the proviso that in not more than 1 occurrence is Q* a halide.

This invention also relates to a method to polymerize olefins comprising contacting olefins (such as ethylene) with an amidinate catalyst compound, a chain transfer agent and an NCA activator represented by the formula (I):

$$R_nM^{**}(ArNHal)_{4-n} \quad (I)$$

where R is a monoanionic ligand; M** is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the NCA comprising an anion of Formula I also comprises a suitable cation that is essentially non-interfering with the ionic catalyst complexes formed with the transition metal compounds, preferably the cation is $Z_d^+$ as described above.

In a preferred embodiment in any of the NCA's comprising an anion represented by Formula I described above, R is selected from the group consisting of substituted or unsubstituted $C_1$ to $C_{30}$ hydrocarbyl aliphatic or aromatic groups, where substituted means that at least one hydrogen on a carbon atom is replaced with a hydrocarbyl, halide, halocarbyl, hydrocarbyl or halocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means $C_4$ to $C_{20}$ hydrocarbyl groups; $—SR^1$, $—NR^2_2$, and $—PR^3_2$, where each $R^1$, $R^2$, or $R^3$ is independently a substituted or unsubstituted hydrocarbyl as defined above; or a $C_1$ to $C_{30}$ hydrocarbyl substituted organometalloid.

In a preferred embodiment in any of the NCA's comprising an anion represented by Formula I described above, the NCA also comprises cation comprising a reducible Lewis acid represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl, preferably the reducible Lewis acid represented by the formula: $(Ph_3C^+)$, where Ph is phenyl or phenyl substituted with a heteroatom, a $C_1$ to $C_{40}$ hydrocarbyl, or a substituted $C_1$ to $C_{40}$ hydrocarbyl.

In a preferred embodiment in any of the NCA's comprising an anion represented by Formula I described above, the NCA also comprises a cation represented by the formula, $(L\text{-}H)_d^+$, wherein L is an neutral Lewis base; H is hydrogen; (L-H) is a Bronsted acid; and d is 1, 2, or 3, preferably $(L\text{-}H)_d^+$ is a Bronsted acid selected from ammoniums, oxoniums, phosphoniums, silyliums, and mixtures thereof.

Further examples of useful activators include those disclosed in U.S. Pat. Nos. 7,297,653 and 7,799,879.

Another activator useful herein comprises a salt of a cationic oxidizing agent and a noncoordinating, compatible anion represented by the formula (16):

$$(OX^{e+})_d(A^{d-})_e \quad (16)$$

wherein $OX^{e+}$ is a cationic oxidizing agent having a charge of e+; e is 1, 2, or 3; d is 1, 2, or 3; and $A^{d-}$ is a non-coordinating anion having the charge of d−(as further described above). Examples of cationic oxidizing agents include: ferrocenium, hydrocarbyl-substituted ferrocenium, $Ag^+$, or $Pb^{+2}$. Preferred embodiments of $A^{d-}$ include tetrakis(pentafluorophenyl)borate.

In another embodiment, the amidinate catalyst compounds and CTA's described herein can be used with Bulky activators. A "Bulky activator" as used herein refers to anionic activators represented by the formula:

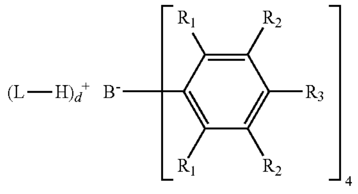

where:

each $R_1$ is, independently, a halide, preferably a fluoride;

each $R_2$ is, independently, a halide, a $C_6$ to $C_{20}$ substituted aromatic hydrocarbyl group or a siloxy group of the formula $—O—Si—R_a$, where $R_a$ is a $C_1$ to $C_{20}$ hydrocarbyl or hydrocarbylsilyl group (preferably $R_2$ is a fluoride or a perfluorinated phenyl group);

each $R_3$ is a halide, $C_6$ to $C_{20}$ substituted aromatic hydrocarbyl group or a siloxy group of the formula $—O—Si—R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring);

L is an neutral Lewis base; $(L\text{-}H)^+$ is a Bronsted acid; d is 1, 2, or 3;

wherein the anion has a molecular weight of greater than 1020 g/mol; and wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV=8.3V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
|---|---|
| H | 1 |
| 1st short period, Li to F | 2 |

-continued

| Element | Relative Volume |
|---|---|
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

Exemplary bulky substituents of activators suitable herein and their respective scaled volumes and molecular volumes are shown in the table below. The dashed bonds indicate binding to boron, as in the general formula above.

(perfluorobiphenyl)borate; triethylammonium tetrakis (perfluorobiphenyl)borate; tripropylammonium tetrakis (perfluorobiphenyl)borate; tri(n-butyl)ammonium tetrakis (perfluorobiphenyl)borate; tri(t-butyl)ammonium tetrakis (perfluorobiphenyl)borate; N,N-dimethylanilinium tetrakis (perfluorobiphenyl)borate; N,N-diethylanilinium tetrakis (perfluorobiphenyl)borate; N,N-dimethyl-(2,4,6-trimethylanilinium) tetrakis(perfluorobiphenyl)borate; tropillium tetrakis(perfluorobiphenyl)borate; triphenylcarbenium tetrakis(perfluorobiphenyl)borate; triphenylphosphonium tetrakis(perfluorobiphenyl)borate; triethylsilylium tetrakis(perfluorobiphenyl)borate; benzene(diazonium) tetrakis

| Activator | Structure of boron substituents | Molecular Formula of each substituent | $V_S$ | MV Per subst. ($Å^3$) | Total MV ($Å^3$) |
|---|---|---|---|---|---|
| Dimethylanilinium tetrakis(perfluoronaphthyl)borate | 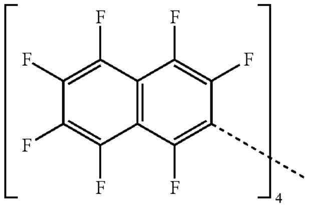 | $C_{10}F_7$ | 34 | 261 | 1044 |
| Dimethylanilinium tetrakis(perfluorobiphenyl)borate | 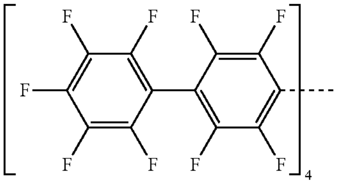 | $C_{12}F_9$ | 42 | 349 | 1396 |
| [4-tButyl-$PhNMe_2H$] [$(C_6F_3(C_6F_5)_2)_4B$] | 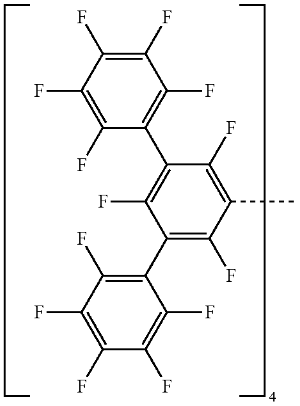 | $C_{18}F_{13}$ | 62 | 515 | 2060 |

Exemplary bulky activators useful in catalyst systems herein include: trimethylammonium tetrakis(perfluoronaphthyl)borate; triethylammonium tetrakis(perfluoronaphthyl) borate; tripropylammonium tetrakis(perfluoronaphthyl)borate; tri(n-butyl)ammonium tetrakis(perfluoronaphthyl) borate; tri(t-butyl)ammonium tetrakis(perfluoronaphthyl) borate; N,N-dimethylanilinium tetrakis(perfluoronaphthyl) borate; N,N-diethylanilinium tetrakis(perfluoronaphthyl) borate; N,N-dimethyl-(2,4,6-trimethylanilinium) tetrakis (perfluoronaphthyl)borate; tropillium tetrakis (perfluoronaphthyl)borate; triphenylcarbenium tetrakis (perfluoronaphthyl)borate; triphenylphosphonium tetrakis (perfluoronaphthyl)borate; triethylsilylium tetrakis (perfluoronaphthyl)borate; benzene(diazonium) tetrakis (perfluoronaphthyl)borate; trimethylammonium tetrakis (perfluorobiphenyl)borate; [4-t-butyl-$PhNMe_2H$][$(C_6F_3(C_6F_5)_2)_4B$]; and the types disclosed in U.S. Pat. No. 7,297,653.

Illustrative, but not limiting, examples of boron compounds which may be used as an activator in the processes of this invention are:

trimethylammonium tetraphenylborate; triethylammonium tetraphenylborate; tripropylammonium tetraphenylborate; tri(n-butyl)ammonium tetraphenylborate; tri(t-butyl)ammonium tetraphenylborate; N,N-dimethylanilinium tetraphenylborate; N,N-diethylanilinium tetraphenylborate; N,N-dimethyl-(2,4,6-trimethylanilinium) tetraphenylborate; tropillium tetraphenylborate; triphenylcarbenium tetraphenylborate; triphenylphosphonium tetraphenylborate triethylsilylium tetraphenylborate; benzene(diazonium)

tetraphenylborate; trimethylammonium tetrakis(pentafluorophenyl)borate; triethylammonium tetrakis(pentafluorophenyl)borate; tripropylammonium tetrakis(pentafluorophenyl)borate; tri(n-butyl)ammonium tetrakis(pentafluorophenyl)borate; tri(sec-butyl)ammonium tetrakis(pentafluorophenyl)borate; N,N-dimethylanilinium tetrakis(pentafluorophenyl)borate; N,N-diethylanilinium tetrakis(pentafluorophenyl)borate; N,N-dimethyl-(2,4,6-trimethylanilinium) tetrakis(pentafluorophenyl)borate; tropillium tetrakis(pentafluorophenyl)borate; triphenylcarbenium tetrakis(pentafluorophenyl)borate; triphenylphosphonium tetrakis(pentafluorophenyl)borate; triethylsilylium tetrakis(pentafluorophenyl)borate; benzene(diazonium) tetrakis(pentafluorophenyl)borate; trimethylammonium tetrakis-(2,3,4,6-tetrafluorophenyl)borate; triethylammonium tetrakis-(2,3,4,6-tetrafluorophenyl)borate; tripropylammonium tetrakis-(2,3,4,6-tetrafluorophenyl)borate; tri(n-butyl)ammonium tetrakis-(2,3,4,6-tetrafluoro-phenyl)borate; dimethyl(t-butyl)ammonium tetrakis-(2,3,4,6-tetrafluorophenyl)borate; N,N-dimethylanilinium tetrakis-(2,3,4,6-tetrafluorophenyl)borate; N,N-diethylanilinium tetrakis-(2,3,4,6-tetrafluorophenyl)borate; N,N-dimethyl-(2,4,6-trimethylanilinium) tetrakis-(2,3,4,6-tetrafluorophenyl)borate; tropillium tetrakis-(2,3,4,6-tetrafluorophenyl)borate; triphenylcarbenium tetrakis-(2,3,4,6-tetrafluorophenyl)borate; triphenylphosphonium tetrakis-(2,3,4,6-tetrafluorophenyl)borate; triethylsilylium tetrakis-(2,3,4,6-tetrafluorophenyl)borate; benzene(diazonium) tetrakis-(2,3,4,6-tetrafluorophenyl)borate; trimethylammonium tetrakis(perfluoronaphthyl)borate; triethylammonium tetrakis(perfluoronaphthyl)borate; tripropylammonium tetrakis(perfluoronaphthyl)borate; tri(n-butyl)ammonium tetrakis(perfluoronaphthyl)borate; tri(t-butyl)ammonium tetrakis(perfluoronaphthyl)borate; N,N-dimethylanilinium tetrakis(perfluoronaphthyl)borate; N,N-diethylanilinium tetrakis(perfluoronaphthyl)borate; N,N-dimethyl-(2,4,6-trimethylanilinium) tetrakis(perfluoronaphthyl)borate; tropillium tetrakis(perfluoronaphthyl)borate; triphenylcarbenium tetrakis(perfluoronaphthyl)borate; triphenylphosphonium tetrakis(perfluoronaphthyl)borate; triethylsilylium tetrakis(perfluoronaphthyl)borate; benzene(diazonium) tetrakis(perfluoronaphthyl)borate; trimethylammonium tetrakis(perfluorobiphenyl)borate; triethylammonium tetrakis(perfluorobiphenyl)borate; tripropylammonium tetrakis(perfluorobiphenyl)borate; tri(n-butyl)ammonium tetrakis(perfluorobiphenyl)borate; tri(t-butyl)ammonium tetrakis(perfluorobiphenyl)borate; N,N-dimethylanilinium tetrakis(perfluorobiphenyl)borate; N,N-diethylanilinium tetrakis(perfluorobiphenyl)borate; N,N-dimethyl-(2,4,6-trimethylanilinium) tetrakis(perfluorobiphenyl)borate; tropillium tetrakis(perfluorobiphenyl)borate; triphenylcarbenium tetrakis(perfluorobiphenyl)borate; triphenylphosphonium tetrakis(perfluorobiphenyl)borate; triethylsilylium tetrakis(perfluorobiphenyl)borate; benzene(diazonium) tetrakis(perfluorobiphenyl)borate; trimethylammonium tetrakis(3,5-bis(trifluoromethyl)phenyl)borate; triethylammonium tetrakis(3,5-bis(trifluoromethyl)phenyl)borate; tripropylammonium tetrakis(3,5-bis(trifluoromethyl)phenyl)borate; tri(n-butyl)ammonium tetrakis(3,5-bis(trifluoromethyl)phenyl)borate; tri(t-butyl)ammonium tetrakis(3,5-bis(trifluoromethyl)phenyl)borate; N,N-dimethylanilinium tetrakis(3,5-bis(trifluoromethyl)phenyl)borate; N,N-diethylanilinium tetrakis(3,5-bis(trifluoromethyl)phenyl)borate; N,N-dimethyl-(2,4,6-trimethylanilinium) tetrakis(3,5-bis(trifluoromethyl)phenyl)borate; tropillium tetrakis(3,5-bis(trifluoromethyl)phenyl)borate; triphenylcarbenium tetrakis(3,5-bis(trifluoromethyl)phenyl)borate; triphenylphosphonium tetrakis(3,5-bis(trifluoromethyl)phenyl)borate; triethylsilylium tetrakis(3,5-bis(trifluoromethyl)phenyl)borate; benzene(diazonium) tetrakis(3,5-bis(trifluoromethyl)phenyl)borate; and dialkyl ammonium salts, such as: di-(i-propyl)ammonium tetrakis(pentafluorophenyl)borate, and dicyclohexylammonium tetrakis(pentafluorophenyl)borate; and additional tri-substituted phosphonium salts, such as tri(o-tolyl)phosphonium tetrakis(pentafluorophenyl)borate, and tri(2,6-dimethylphenyl)phosphonium tetrakis(pentafluorophenyl)borate.

Preferred activators include N,N-dimethylanilinium tetrakis(perfluoronaphthyl)borate; N,N-dimethylanilinium tetrakis(perfluorobiphenyl)borate; N,N-dimethylanilinium tetrakis(3,5-bis(trifluoromethyl)phenyl)borate; triphenylcarbenium tetrakis(perfluoronaphthyl)borate; triphenylcarbenium tetrakis(perfluorobiphenyl)borate; triphenylcarbenium tetrakis(3,5-bis(trifluoromethyl)phenyl)borate; triphenylcarbenium tetrakis(perfluorophenyl)borate; $[Ph_3C^+][B(C_6F_5)_4^-]$; $[Me_3NH^+][B(C_6F_5)_4^-]$; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate; N,N-dialkylanilinium tetrakis(pentafluorophenyl)borate; N,N-dimethyl-(2,4,6-trimethylanilinium) tetrakis(pentafluorophenyl)borate; trialkylammonium tetrakis-(2,3,4,6-tetrafluorophenyl)borate; N,N-dialkylanilinium tetrakis-(2,3,4,6-tetrafluorophenyl)borate; trialkylammonium tetrakis(perfluoronaphthyl)borate; N,N-dialkylanilinium tetrakis(perfluoronaphthyl)borate; trialkylammonium tetrakis(perfluorobiphenyl)borate; N,N-dialkylanilinium tetrakis(perfluorobiphenyl)borate; trialkylammonium tetrakis(3,5-bis(trifluoromethyl)phenyl)borate; N,N-dialkylanilinium tetrakis(3,5-bis(trifluoromethyl)phenyl)borate; N,N-dialkyl-(2,4,6-trimethylanilinium) tetrakis(3,5-bis(trifluoromethyl)phenyl)borate; di-(i-propyl)ammonium tetrakis(pentafluorophenyl)borate; (where alkyl is methyl, ethyl, propyl, n-butyl, sec-butyl, or t-butyl).

In a preferred embodiment, any of the activators described herein may be mixed together before or after combination with the catalyst compound and/or CTA, preferably before being mixed with the catalyst compound and/or CTA.

In some embodiments, two NCA activators may be used in the polymerization and the molar ratio of the first NCA activator to the second NCA activator can be any ratio. In some embodiments, the molar ratio of the first NCA activator to the second NCA activator is 0.01:1 to 10,000:1, preferably 0.1:1 to 1000:1, preferably 1:1 to 100:1.

Further, the typical activator-to-catalyst ratio, e.g., all NCA activators-to-catalyst ratio is a 1:1 molar ratio. Alternate preferred ranges include from 0.1:1 to 100:1, alternately from 0.5:1 to 200:1, alternately from 1:1 to 500:1, alternately from 1:1 to 1000:1. A particularly useful range is from 0.5:1 to 10:1, preferably 1:1 to 5:1.

It is also within the scope of this invention that the catalyst compounds can be combined with combinations of alumoxanes and NCA's (see for example, U.S. Pat. Nos. 5,153,157; 5,453,410; European Patent No. EP 0 573 120 B1; and PCT Publication Nos. WO 94/07928, and WO 95/14044 which discuss the use of an alumoxane in combination with an ionizing activator).

When an ionic or neutral stoichiometric activator is used, the catalyst-precursor-to-activator molar ratio is from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2. The catalyst-precursor-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1, 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

Preferred activators and activator/co-activator combinations include methylalumoxane, modified methylalumoxane, mixtures of methylalumoxane with dimethylanilinium tetrakis(pentafluorophenyl)borate or tris(pentafluorophenyl) boron, and mixtures of trimethyl aluminum with dimethylanilinium tetrakis(pentafluorophenyl)borate or tris (pentafluorophenyl)boron.

Scavengers

In some embodiments, scavenging compounds are used with stoichiometric activators. Typical aluminum or boron alkyl components useful as scavengers are represented by the general formula $R^xJZ_2$ where J is aluminum or boron, $R^x$ is as previously defined above, and each Z is independently $R^x$ or a different univalent anionic ligand, such as halogen (Cl, Br, I), alkoxide ($OR^x$), and the like. Most preferred aluminum alkyls include triethylaluminum, diethylaluminum chloride, tri-iso-butylaluminum, tri-n-octylaluminum, tri-n-hexylaluminum, trimethylaluminum, and the like. Preferred boron alkyls include triethylboron. Scavenging compounds may also be alumoxanes and modified alumoxanes including methylalumoxane and modified methylalumoxane. Preferred alkylzinc, aluminum alkyl or organoaluminum compounds which may be utilized as scavengers include, for example, trimethylaluminum, triethylaluminum, triisobutylaluminum, tri-n-hexylaluminum, tri-n-octylaluminum, and diethyl zinc.

Supported Catalysts

The catalyst compound(s) can be supported or non-supported. To prepare uniform supported catalysts, the catalyst or catalyst precursor preferably dissolves in the chosen solvent. The term "uniform supported catalyst" means that the catalyst, or the catalyst precursor and the activator, and or the activated catalyst approach uniform distribution upon the support's accessible surface area, including the interior pore surfaces of porous supports. Some embodiments of supported catalysts prefer uniform supported catalysts; other embodiments show no such preference.

Invention supported catalyst systems may be prepared by any method effective to support other coordination catalyst systems, effective meaning that the catalyst so prepared can be used for oligomerizing or polymerizing olefin in a heterogenous process. The catalyst precursor, activator, co-activator if needed, suitable solvent, and support may be added in any order or simultaneously.

By one method, the activator, dissolved in an appropriate solvent such as toluene may be stirred with the support material for 1 minute to 10 hours. The total solution volume may be greater than the pore volume of the support, but some embodiments limit the total solution volume below that needed to form a gel or slurry (about 90% to 400%, preferably about 100% to 200% of the pore volume). The mixture is optionally heated from 30° C. to 200° C. during this time. The catalyst precursor may be added to this mixture as a solid, if a suitable solvent is employed in the previous step, or as a solution. Or alternatively, this mixture can be filtered, and the resulting solid mixed with a catalyst precursor solution. Similarly, the mixture may be vacuum dried and mixed with a catalyst precursor solution. The resulting catalyst mixture is then stirred for 1 minute to 10 hours, and the catalyst is either filtered from the solution and vacuum dried or evaporation alone removes the solvent.

Alternatively, the catalyst precursor and activator may be combined in solvent to form a solution. Then the support is added, and the mixture is stirred for 1 minute to 10 hours. The total solution volume may be greater than the pore volume of the support, but some embodiments limit the total solution volume below that needed to form a gel or slurry (about 90% to 400%, preferably about 100% to 200% of the pore volume). After stirring, the residual solvent is removed under vacuum, typically at ambient temperature and over 10 to 16 hours. But greater or lesser times and temperatures are possible.

The catalyst precursor may also be supported absent the activator; in that case, the activator (and co-activator if needed) is added to a slurry process's liquid phase. For example, a solution of catalyst precursor may be mixed with a support material for a period of about 1 minute to 10 hours. The resulting pre-catalyst mixture may be filtered from the solution and dried under vacuum, or evaporation alone removes the solvent. The total catalyst-precursor-solution volume may be greater than the support's pore volume, but some embodiments limit the total solution volume below that needed to form a gel or slurry (about 90% to 400%, preferably about 100% to 200% of the pore volume).

Additionally, two or more different catalyst precursors may be placed on the same support using any of the support methods disclosed above. Likewise, two or more activators or an activator and co-activator may be placed on the same support.

Suitable solid particle supports are typically comprised of polymeric or refractory oxide materials, each being preferably porous. Any support material that has an average particle size greater than 10 μm is suitable for use in this invention. Various embodiments select a porous support material, such as for example, talc, inorganic oxides, inorganic chlorides; for example, magnesium chloride and resinous support materials, such as polystyrene polyolefin or polymeric compounds or any other organic support material, and the like. Some embodiments select inorganic oxide materials as the support material including Group-2, -3, -4, -5, -13, or -14 metal or metalloid oxides. Some embodiments select the catalyst support materials to include silica, alumina, silica-alumina, and their mixtures. Other inorganic oxides may serve either alone or in combination with the silica, alumina, or silica-alumina. These are magnesia, titania, zirconia, and the like. Lewis acidic materials, such as montmorillonite and similar clays may also serve as a support. In this case, the support can optionally double as the activator component. But additional activator may also be used.

The support material may be pretreated by any number of methods. For example, inorganic oxides may be calcined, chemically treated with dehydroxylating agents, such as aluminum alkyls and the like, or both.

As stated above, polymeric carriers will also be suitable in accordance with the invention, see for example the descriptions in WO 95/15815 and U.S. Pat. No. 5,427,991. The methods disclosed may be used with the catalyst complexes, activators or catalyst systems of this invention to adsorb or absorb them on the polymeric supports, particularly if made up of porous particles, or may be chemically bound through functional groups bound to or in the polymer chains.

Invention catalyst carriers may have a surface area of from 10-700 $m^2/g$, a pore volume of 0.1 cc/g to 4.0 cc/g and an average particle size of 10 μm to 500 μm. Some embodiments select a surface area of 50 $m^2/g$ to 500 $m^2/g$, a pore volume of 0.5 cc/g to 3.5 cc/g, or an average particle size of 20 μm to 200 μm. Other embodiments select a surface area of 100 $m^2/g$ to 400 $m^2/g$, a pore volume of 0.8 cc/g to 3.0 cc/g, and an average particle size of 30 μm to 100 μm. Invention carriers typically have a pore size of 10 to 1000 Angstroms, alternatively 50 to 500 Angstroms, or 75 to 350 Angstroms.

Invention catalysts are generally deposited on the support at a loading level of 10 to 100 micromoles of catalyst precursor per gram of solid support; alternately 20 to 80 micromoles of catalyst precursor per gram of solid support; or 40 to 60 micromoles of catalyst precursor per gram of support. But greater or lesser values may be used provided that the total amount of solid catalyst precursor does not exceed the support's pore volume.

Invention catalysts can be supported for gas-phase, bulk, or slurry polymerization, or otherwise as needed. Numerous support methods are known for catalysts in the olefin polymerization art, particularly alumoxane-activated catalysts; all are suitable for this invention's broadest practice. See, for example, U.S. Pat. Nos. 5,057,475 and 5,227,440. An example of supported ionic catalysts appears in WO 94/03056. U.S. Pat. No. 5,643,847 and WO 96/04319A describe a particularly effective method. A bulk or slurry process using this invention's supported metal complexes activated with alumoxane can be used for ethylene-propylene rubber as described in U.S. Pat. Nos. 5,001,205 and 5,229,478. Additionally, those processes suit this invention's catalyst systems. Both polymers and inorganic oxides may serve as supports, as is known in the art. See U.S. Pat. Nos. 5,422,325; 5,427,991; 5,498,582; 5,466,649; international publications WO 93/11172 and WO 94/07928.

Monomers

The catalyst compounds can be used to polymerize or oligomerize any unsaturated monomer or monomers. Preferred monomers include $C_2$ to $C_{100}$ olefins, preferably $C_2$ to $C_{60}$ olefins, preferably $C_2$ to $C_{40}$ olefins preferably $C_2$ to $C_{20}$ olefins, preferably $C_2$ to $C_{12}$ olefins. In some embodiments, preferred monomers include linear, branched or cyclic alpha-olefins, preferably $C_2$ to $C_{100}$ alpha-olefins, preferably $C_2$ to $C_{60}$ alpha-olefins, preferably $C_2$ to $C_{40}$ alpha-olefins, preferably $C_2$ to $C_{20}$ alpha-olefins, preferably $C_2$ to $C_{12}$ alpha-olefins. Preferred olefin monomers may be one or more of ethylene, propylene, butene, pentene, hexene, heptene, octene, nonene, decene, dodecene, 4-methylpentene-1,3-methylpentene-1, 3,5,5-trimethylhexene-1, and 5-ethylnonene-1.

In another embodiment, the polymer produced herein is a copolymer of one or more linear or branched $C_3$ to $C_{30}$ prochiral alpha-olefins or $C_5$ to $C_{30}$ ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

Preferred monomers may also include aromatic-group-containing monomers containing up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally, two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, para-methylstyrene, 4-phenyl-1-butene, and allyl benzene.

Non aromatic cyclic group containing monomers are also preferred. These monomers can contain up to 30 carbon atoms. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, $C_1$ to $C_{10}$ alkyl groups. Preferred non-aromatic cyclic group containing monomers include vinylcyclohexane, vinylcyclohexene, cyclopentadiene, cyclopentene, 4-methylcyclopentene, cyclohexene, 4-methylcyclohexene, cyclobutene, vinyladamantane, norbornene, 5-methylnorbornene, 5-ethylnorbornene, 5-propylnorbornene, 5-butylylnorbornene, 5-pentylnorbomene, 5-hexylnorbornene, 5-heptylnorbornene, 5-octylnorbornene, 5-nonylnorbornene, 5-decylnorbornene, 5-phenylnorbornene, vinylnorbornene, ethylidene norbornene, 5,6-dimethylnorbornene, 5,6-dibutylnorbornene, and the like.

Preferred diolefin monomers useful in this invention include any hydrocarbon structure, preferably $C_4$ to $C_{30}$, having at least two unsaturated bonds, wherein at least one, typically two, of the unsaturated bonds are readily incorporated into a polymer by either a stereospecific or a non-stereospecific catalyst(s). It is further preferred that the diolefin monomers be selected from alpha-omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

Non-limiting examples of preferred polar unsaturated monomers useful in this invention, particularly with group 4 and 6 metal compounds, include nitro substituted monomers including 6-nitro-1-hexene; amine substituted monomers including N-methylallylamine, N-allylcyclopentylamine, and N-allyl-hexylamine; ketone substituted monomers including methyl vinyl ketone, ethyl vinyl ketone, and 5-hexen-2-one; aldehyde substituted monomers including acrolein, 2,2-dimethyl-4-pentenal, undecylenic aldehyde, and 2,4-dimethyl-2,6-heptadienal; alcohol substituted monomers including allyl alcohol, 7-octen-1-ol, 7-octene-1,2-diol, 10-undecen-1-ol, 10-undecene-1,2-diol, 2-methyl-3-buten-1-ol; acetal, epoxide and or ether substituted monomers including 4-hex-5-enyl-2,2-dimethyl-[1,3]dioxolane, 2,2-dimethyl-4-non-8-enyl-[1,3]dioxolane, acrolein dimethyl acetal, butadiene monoxide, 1,2-epoxy-7-octene, 1,2-epoxy-9-decene, 1,2-epoxy-5-hexene, 2-methyl-2-vinyloxirane, allyl glycidyl ether, 2,5-dihydrofuran, 2-cyclopenten-1-one ethylene ketal, 11-methoxyundec-1-ene, and 8-methoxyoct-1-ene; sulfur containing monomers including allyl disulfide; acid and ester substituted monomers including acrylic acid, vinylacetic acid, 4-pentenoic acid, 2,2-dimethyl-4-pentenoic acid, 6-heptenoic acid, trans-2,4-pentadienoic acid, 2,6-heptadienoic acid, methyl acrylate, ethyl acrylate, tert-butyl acrylate, n-butyl acrylate, methacrylic acid, methyl methacrylate, ethyl methacrylate, tert-butyl methacrylate, n-butyl methacrylate, hydroxypropyl acrylate, acetic acid oct-7-enyl ester, non-8-enoic acid methyl ester, acetic acid undec-10-enyl ester, dodec-11-enoic acid methyl ester, propionic acid undec-10-enyl ester, dodec-11-enoic acid ethyl ester, and nonylphenoxypolyetheroxy acrylate; siloxy containing monomers including trimethyloct-7-enyloxy silane, and trimethylundec-10-enyloxy silane, polar functionalized norbornene monomers including 5-norbornene-2-carbonitrile, 5-norbornene-2-carboxaldehyde, 5-norbornene-2-carboxylic acid, cis-5-norbornene-endo-2,3-dicarboxylic acid, 5-norbornene-2,2,-dimethanol, cis-5-norbornene-endo-2,3-dicarboxylic anhydride, 5-norbornene-2-endo-3-endo-dimethanol, 5-norbornene-2-endo-3-exo-dimethanol, 5-norbornene-2-methanol, 5-norbornene-2-ol, 5-norbornene-2-yl acetate, 1-[2-(5-norbornene-2-yl)ethyl]-3,5,7,9,11,13,15-heptacyclopentylpentacyclo[9.5.1.$1^{3,9}$.$1^{5,15}$.$1^{7,13}$]octasiloxane, 2-benzoyl-5-norbornene, 2-acetyl-5-norbornene, 7-syn methoxymethyl-5-norbornen-2-one, 5-norbornen-2-ol, and 5-norbornen-2-yloxy-trimethylsilane, and partially fluorinated monomers including nonafluoro-1-hexene, allyl-1,1,2,2,-tetrafluoroethyl ether, 2,2,3,3-tetrafluoro-non-8-enoic acid ethyl ester, 1,1,2,2-tetrafluoro-2-(1,1,2,2-tetrafluoro-oct-7-enyloxy)-ethanesulfonyl fluoride, acrylic acid 2,2,3,3,4,4,5,5,6,6,7,7,8,8,8-pentadecafluoro-octyl ester, and 1,1,2,2-tetrafluoro-2-(1,1,2,2,3,3,4,4-octafluoro-dec-9-enyloxy)-ethanesulfonyl fluoride.

In an embodiment herein, the process described herein is used to produce an oligomer of any of the monomers listed above. Preferred oligomers include oligomers of any $C_2$ to $C_{20}$ olefins, preferably $C_2$ to $C_{12}$ alpha-olefins, most preferably oligomers comprising ethylene, propylene and or butene are prepared. A preferred feedstock for the oligomerization process is the alpha-olefin, ethylene. But other alpha-olefins, including but not limited to propylene and 1-butene, may also be used alone or combined with ethylene. Preferred alpha-olefins include any $C_2$ to $C_{40}$ alpha-olefin, preferably and $C_2$ to $C_{20}$ alpha-olefin, preferably any $C_2$ to $C_{12}$ alpha-olefin, preferably ethylene, propylene, and butene, most preferably ethylene. Dienes may be used in the processes described herein, preferably alpha-omega-dienes are used alone or in combination with mono-alpha olefins.

In a preferred embodiment, the process described herein may be used to produce homopolymers or copolymers. For the purposes of this invention and the claims thereto a copolymer may comprise two, three, four or more different monomer units. Preferred polymers produced herein include homopolymers or copolymers of any of the above monomers. In a preferred embodiment, the polymer is a homopolymer of any $C_2$ to $C_{12}$ alpha-olefin. Preferably, the polymer is a homopolymer of ethylene or a homopolymer of propylene. In another embodiment, the polymer is a copolymer comprising ethylene and one or more of any of the monomers listed above. In another embodiment, the polymer is a copolymer comprising propylene and one or more of any of the monomers listed above. In another preferred embodiment, the homopolymers or copolymers described, additionally comprise one or more diolefin comonomers, preferably one or more $C_4$ to $C_{40}$ diolefins.

In another preferred embodiment, the polymer produced herein is a copolymer of ethylene and one or more $C_3$ to $C_{20}$ linear, branched or cyclic monomers, preferably one or more $C_3$ to $C_{12}$ linear, branched or cyclic alpha-olefins. Preferably, the polymer produced herein is a copolymer of ethylene and one or more of propylene, butene, pentene, hexene, heptene, octene, nonene, decene, dodecene, 4-methylpentene-1,3-methylpentene-1,3,5,5-trimethylhexene-1, cyclopentene, 4-methylcyclopentene, cyclohexene, and 4-methylcyclohexene.

In another preferred embodiment, the polymer produced herein is a copolymer of propylene and one or more $C_2$ or $C_4$ to $C_{20}$ linear, branched or cyclic monomers, preferably one or more $C_2$ or $C_4$ to $C_{12}$ linear, branched or cyclic alpha-olefins. Preferably, the polymer produced herein is a copolymer of propylene and one or more of ethylene, butene, pentene, hexene, heptene, octene, nonene, decene, dodecene, 4-methylpentene-1,3-methylpentene-1, and 3,5,5-trimethylhexene-1.

In a preferred embodiment, the polymer produced herein is a homopolymer of norbornene or a copolymer of norbornene and a substituted norbornene, including polar functionalized norbornenes.

In a preferred embodiment, the copolymers described herein comprise at least 50 mol % of a first monomer and up to 50 mol % of other monomers.

In another embodiment, the polymer comprises a first monomer present at from 40 mol % to 95 mol %, preferably 50 mol % to 90 mol %, preferably 60 mol % to 80 mol %, and a comonomer present at from 5 mol % to 60 mol %, preferably 10 mol % to 40 mol %, more preferably 20 mol % to 40 mol %, and a termonomer present at from 0 mol % to 10 mol %, more preferably from 0.5 mol % to 5 mol %, more preferably 1 mol % to 3 mol %.

In a preferred embodiment, the first monomer comprises one or more of any $C_3$ to $C_8$ linear branched or cyclic alpha-olefins, including propylene, butene, (and all isomers thereof), pentene (and all isomers thereof), hexene (and all isomers thereof), heptene (and all isomers thereof), and octene (and all isomers thereof). Preferred monomers include propylene, 1-butene, 1-hexene, 1-octene, cyclopentene, cyclohexene, cyclooctene, hexadiene, cyclohexadiene, and the like.

In a preferred embodiment, the comonomer comprises one or more of any $C_2$ to $C_{40}$ linear, branched or cyclic alpha-olefins (provided ethylene, if present, is present at 5 mol % or less), including ethylene, propylene, butene, pentene, hexene, heptene, and octene, nonene, decene, undecene, dodecene, hexadecene, butadiene, hexadiene, heptadiene, pentadiene, octadiene, nonadiene, decadiene, dodecadiene, styrene, 3,5,5-trimethylhexene-1,3-methylpentene-1,4-methylpentene-1, cyclopentadiene, and cyclohexene.

In a preferred embodiment, the termonomer comprises one or more of any $C_2$ to $C_{40}$ linear, branched or cyclic alpha-olefins, (provided ethylene, if present, is present at 5 mol % or less), including ethylene, propylene, butene, pentene, hexene, heptene, and octene, nonene, decene, undecene, dodecene, hexadecene, butadiene, hexadiene, heptadiene, pentadiene, octadiene, nonadiene, decadiene, dodecadiene, styrene, 3,5, 5-trimethylhexene-1, 3-methylpentene-1,4-methylpentene-1, cyclopentadiene, and cyclohexene.

In a preferred embodiment, the polymers described above further comprise one or more dienes at up to 10 wt %, preferably at 0.00001 wt % to 1.0 wt %, preferably 0.002 wt % to 0.5 wt %, even more preferably 0.003 wt % to 0.2 wt %, based upon the total weight of the composition. In some embodiments, 500 ppm or less of diene is added to the polymerization, preferably 400 ppm or less, preferably or 300 ppm or less. In other embodiments, at least 50 ppm of diene is added to the polymerization, or 100 ppm or more, or 150 ppm or more.

Polymerization Processes

The catalyst compounds can be used to polymerize and/or oligomerize one or more monomers using any one or more solution, slurry, gas-phase, and high-pressure polymerization processes. The catalyst compound and optional co-catalyst(s), can be delivered as a solution or slurry, either separately to a reactor, activated in-line just prior to a reactor, or preactivated and pumped as an activated solution or slurry to a reactor. Polymerizations can be carried out in either single reactor operations, in which monomer, comonomers, catalyst/activator/co-activator, optional scavenger, and optional modifiers are added continuously to a single reactor or in series reactor operations, in which the above components are added to each of two or more reactors connected in series. The catalyst components can be added to the first reactor in the series. The catalyst component may also be added to both reactors, with one component being added to first reaction and another component to other reactors. In one preferred embodiment, the pre-catalyst is activated in the reactor in the presence of olefin.

The catalyst compositions can be used individually or can be mixed with other known polymerization catalysts to prepare polymer blends. Monomer and catalyst selection allows polymer blend preparation under conditions analogous to those using individual catalysts. Polymers having increased MWD for improved processing and other traditional benefits available from polymers made with mixed catalyst systems can thus be achieved.

One or more scavenging compounds can be used. Here, the term scavenging compound means a compound that removes polar impurities from the reaction environment. These impurities adversely affect catalyst activity and stability. Typically, purifying steps are usually used before introducing reaction components to a reaction vessel. But such steps will rarely allow polymerization without using some scavenging compounds. Normally, the polymerization process will still use at least small amounts of scavenging compounds.

Typically, the scavenging compound will be an organometallic compound such as the Group-13 organometallic compounds of U.S. Pat. Nos. 5,153,157; 5,241,025; international publications WO-A-91/09882; WO-A-94/03506; WO-A-93/14132; and that of WO 95/07941. Exemplary compounds include triethyl aluminum, triethyl borane, tri-iso-butyl aluminum, methyl alumoxane, iso-butyl alumoxane, and tri-n-octyl aluminum. Those scavenging compounds having bulky or $C_6$ to $C_{20}$ linear hydrocarbyl substituents connected to the metal or metalloid center usually minimize adverse interaction with the active catalyst. Examples include triethylaluminum, but more preferably, bulky compounds, such as tri-iso-butyl aluminum, tri-iso-propyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, $[Me_2HNPh]^+[B(pfp)_4]^-$ or $B(pfp)_3$ (perfluorophenyl=pfp=$C_6F_5$).

Gas Phase Polymerization

Generally, in a fluidized gas bed process for producing polymers, a gaseous stream containing one or more monomers is continuously cycled through a fluidized bed in the presence of a catalyst under reactive conditions. The gaseous stream can be withdrawn from the fluidized bed and recycled back into the reactor. Simultaneously, polymer product can be withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.)

The reactor pressure in a gas phase process may vary from about 10 psig (69 kPa) to about 500 psig (3448 kPa), preferably from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 70° C. to 110° C., and most preferably in the range of from about 70° C. to about 95° C. In another embodiment, when high density polyethylene is desired then the reactor temperature is typically between 70° C. and 105° C.

The productivity of the catalyst or catalyst system in a gas phase system is influenced by the partial pressure of the main monomer. The preferred mole percent of the main monomer, ethylene or propylene, preferably ethylene, is from about 25 mol % to 90 mol % and the comonomer partial pressure is in the range of from about 138 kPa to about 517 kPa, preferably about 517 kPa to about 2069 kPa, which are typical conditions in a gas phase polymerization process. Also, in some systems the presence of comonomer can increase productivity.

In a preferred embodiment, the reactor utilized in the present invention is capable of producing more than 500 lbs of polymer per hour (227 Kg/hr) to about 200,000 lbs/hr (90,900 Kg/hr) or higher, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and preferably greater than 65,000 lbs/hr (29,000 Kg/hr) to greater than 100,000 lbs/hr (45,500 Kg/hr), and most preferably over 100,000 lbs/hr (45,500 Kg/hr).

Other gas phase processes contemplated by the process of the invention include those described in U.S. Pat. Nos. 5,627,242; 5,665,818; 5,677,375; European publications EP-A-0 794 200; EP-A-0 802 202; and EP-B-634 421; all of which are herein fully incorporated by reference.

In another preferred embodiment, the catalyst system is in liquid form and is introduced into the gas phase reactor into a resin particle lean zone. For information on how to introduce a liquid catalyst system into a fluidized bed polymerization into a particle lean zone, please see U.S. Pat. No. 5,693,727, which is incorporated by reference herein.

Slurry Phase Polymerization

A slurry polymerization process generally operates between 1 to about 50 atmosphere pressure range (15 psig to 735 psig, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process should be operated above the reaction diluent critical temperature and pressure. Preferably, a hexane or an isobutane medium is employed.

In one embodiment, a preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. The preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. The reactor is maintained at a pressure of 3620 kPa to 4309 kPa and at a temperature in the range of about 60° C. to about 104° C., depending on the desired polymer melting characteristics. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In another embodiment, the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment, the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

In another embodiment in the slurry process of the invention, the total reactor pressure is in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In yet another embodiment in the slurry process of the invention, the concentration of predominant monomer in the reactor liquid medium is in the range of from about 1 wt % to about 10 wt %, preferably from about 2 wt % to about 7 wt %, more preferably from about 2.5 wt % to about 6 wt %, most preferably from about 3 wt % to about 6 wt %.

Another process of the invention is where the process, preferably a slurry or gas phase process, is operated in the absence of or essentially free of any scavengers, such as triethylaluminum, trimethylaluminum, tri-iso-butylaluminum, tri-n-hexylaluminum, diethyl to aluminum chloride, dibutyl zinc, and the like. This process is described in PCT publication WO 96/08520 and U.S. Pat. No. 5,712,352, which are herein fully incorporated by reference.

In another embodiment, the process is run with scavengers. Typical scavengers include trimethyl aluminum, tri-iso-butyl aluminum and an excess of alumoxane or modified alumoxane.

Homogeneous, Bulk or Solution Phase Polymerization

The catalysts described herein can be used advantageously in homogeneous solution processes. Generally, this involves polymerization in a continuous reactor in which the polymer formed and the starting monomer and catalyst materials supplied, are agitated to reduce or avoid concentration gradients. Suitable processes operate above the melting point of the polymers at high pressures, from 1 bar to 3000 bar (10 MPa to 30,000 MPa), in which the monomer acts as diluent or in solution polymerization using a solvent.

Temperature control in the reactor is obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds may also be used. The reactor temperature depends on the catalyst used. In general, the reactor temperature preferably can vary between about 0° C. and about 160° C., more preferably from about 10° C. to about 140° C., and most preferably from about 40° C. to about 120° C. In series operation, the second reactor temperature is preferably higher than the first reactor temperature. In parallel reactor operation, the temperatures of the two reactors are independent. The pressure can vary from about 1 mm Hg to 2500 bar (25,000 MPa), preferably from 0.1 bar to 1600 bar (1 MPa to 16,000 MPa), most preferably from 1.0 bar to 500 bar (10 MPa to 5000 MPa).

Each of these processes may also be employed in single reactor, parallel or series reactor configurations. The liquid processes comprise contacting olefin monomers with the above described catalyst system in a suitable diluent or solvent and allowing said monomers to react for a sufficient time to produce the desired polymers. Hydrocarbon solvents are suitable, both aliphatic and aromatic. Alkanes, such as hexane, pentane, isopentane, and octane, are preferred.

The process can be carried out in a continuous stirred tank reactor, batch reactor, or plug flow reactor, or more than one reactor operated in series or parallel. These reactors may have or may not have internal cooling and the monomer feed may or may not be refrigerated. See the general disclosure of U.S. Pat. No. 5,001,205 for general process conditions. See, also, international publications WO 96/33227 and WO 97/22639.

Medium and High Pressure Polymerizations

In the high pressure process for the polymerization of ethylene alone or in combination with $C_3$ to $C_{10}$ alpha-olefins and optionally other copolymerizable olefins, the temperature of the medium within which the polymerization reaction occurs is at least 120° C. and preferably above 140° C. and may range to 350° C., but below the decomposition temperature of said polymer product, typically from 310° C. to 325° C. Preferably, the polymerization is completed at a temperature within the range of 130° C. to 230° C. The polymerization is completed at a pressure above 200 bar (20 MPa), and generally at a pressure within the range of 500 bar (50 MPa) to 3500 bar (350 MPa). Preferably, the polymerization is completed at a pressure within the range from 800 bar (80 MPa) to 2500 bar (250 MPa).

For medium pressure process, the temperature within which the polymerization reaction occurs is at least 80° C. and ranges from 80° C. to 250° C., preferably from 100° C. to 220° C., and should for a given polymer in the reactor, be above the melting point of said polymer so as to maintain the fluidity of the polymer-rich phase. The pressure can be varied between 100 bar (10 MPa) and 1000 bar (100 MPa) for ethylene homopolymers and from 30 bar (3 MPa) to 1000 bar (100 MPa), especially 50 bar (5 MPa) to 500 bar (50 MPa) for processes producing ethylene copolymers containing $C_3$ to $C_{10}$ olefins and optionally other copolymerizable olefins.

More recently, polymerization conditions for high pressure and or temperature polymerizations to prepare propylene homopolymers and copolymers of propylene with $C_3$ to $C_{10}$ olefins and optionally other copolymerizable olefins have been reported. See U.S. Patent applications 60/431,185 filed Dec. 5, 2002; 60/431,077, filed Dec. 5, 2002; and 60/412,541, filed Sep. 20, 2002.

After polymerization and deactivation of the catalyst, the polymer product can be recovered by processes well known in the art. Any excess reactants may be flashed off from the polymer and the polymer obtained extruded into water and cut into pellets or other suitable comminuted shapes. For general process conditions, see the general disclosure of U.S. Pat. Nos. 5,084,534; 5,408,017; 6,127,497; and 6,255,410; which are incorporated herein by reference.

Polymer Product

Preferred polymers produced herein include polyolefins, such as ethylene homo- or co-polymers or propylene homo- or co-polymers. For example, ethylene copolymers include polymers of ethylene with α-olefins, cyclic olefins and diolefins, vinylaromatic olefins, α-olefinic diolefins, substituted α-olefins, and/or acetylenically unsaturated monomers. Non-limiting examples of α-olefins include propylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane. Non-limiting examples of vinylaromatic olefins include styrene, para-methylstyrene, para-t-butylstyrene, vinylnaphthylene, vinyltoluene, and divinylbenzene. Non-limiting examples of α-olefinic dienes include 1,4-hexadiene, 1,5-hexadiene, 1,5-heptadiene, 1,6-heptadiene, 6-methyl-1,6-heptadiene, 1,7-octadiene, 7-methyl-1,7-octadiene, 1,9-decadiene, 1,11-dodecene, 1,13-tetradecene and 9-methyl-1,9-decadiene. Likewise propylene copolymers can be made with the same comonomers. Substituted α-olefins (also called functional group containing α-olefins) include those containing at least one non-carbon Group 13 to 17 atom bound to a carbon atom of the substituted α-olefin where such substitution if silicon may be adjacent to the double bond or terminal to the double bond, or anywhere in between, and where inclusion of non-carbon and non-silicon atoms, such as, for example, B, O, S, Se, Te, N, P, Ge, Sn, Pb, As, F, Cl, Br, or I, are contemplated, where such non-carbon or non-silicon moieties are sufficiently far removed from the double bond so as not to interfere with the coordination polymerization reaction with the catalyst and so to retain the generally hydrocarbyl characteristic. By being sufficiently far removed from the double bond we intend that the number of carbon atoms, or the number of carbon and silicon atoms, separating the double bond and the non-carbon or non-silicon moiety may be 6 or greater, e.g., 7, or 8, or 9, or 10, or 11, or 12, or 13, or 14 or more. The number of such carbon atoms, or carbon and silicon atoms, is counted from immediately adjacent to the double bond to immediately adjacent to the non-carbon or non-silicon moiety. Examples include allyltrimethylsilane, divinylsilane, 8,8,8-trifluoro-1-octene, 8-methoxyoct-1-ene, 8-methylsulfanyloct-1-ene, 8-dimethylaminooct-1-ene, or combinations thereof. The use of functional group-containing α-olefins where the functional group is closer to the double bond is also within the scope of embodiments of the invention when such olefins may be incorporated in the same manner as are their α-olefin analogs. See, "Metallocene Catalysts and Borane Reagents in The Block/Graft Reactions of Polyolefins", T. C. Chung, et al., *Polym. Mater. Sci. Eng.,* 1995, 73, 463; and the masked α-olefin monomers of U.S. Pat. No. 5,153,282. Such monomers permit the preparation of both functional-group containing copolymers capable of subsequent derivatization, and of functional macromers which may be used as graft and block type polymeric segments. All documents cited herein are incorporated by reference for purposes of all jurisdictions where such practice is allowed. Copolymerization can also incorporate α-olefinic macromonomers of up to 2000 mer units.

In terms of polymer density, the polymers produced herein can range from about 0.85 to about 0.95 g/cm$^3$, preferably from about 0.87 to about 0.93 g/cm$^3$, more preferably from about 0.89 to about 0.920 g/cm$^3$, (determined according to ASTM D 1505). Polymer molecular weights can range from about 50,000 Mn to about 2,000,000 g/mol Mn or greater. Molecular weight distributions (Mw/Mn) can range from about 1.1 to about 50.0, with molecular weight distributions from 1.2 to about 5.0 being more typical. Pigments, antioxidants, and other additives, as is known in the art, may be added to the polymer.

In a preferred embodiment of the invention the polymer produced herein has high Mw (e.g. greater than 1,000,000 g/mol), high melting point (such as 130° C. or more) and narrow Mw/Mn (such as less than 3, preferably from greater than 1 to 3).

In another embodiment, this invention relates to:

1. A process for polymerization comprising contacting ethylene and optionally one or more unsaturated monomers with a catalyst compound represented by the structure:

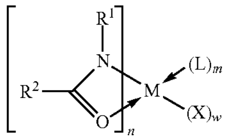

wherein M is a Group 4 transition metal (Ti, Zr or Hf); N is nitrogen; O is oxygen; each X is, independently, a hydride, a halogen, a hydrocarbyl, a substituted hydrocarbyl, a halocarbyl, or a substituted halocarbyl; w is 1, 2, or 3; X is independently selected from halogen, alkoxide, aryloxide, amide, phosphide, or other anionic ligand when Lewis-acid activators (such as methylalumoxane, aluminum alkyls, alkylaluminum alkoxides) or alkylaluminum halides (capable of donating a hydride, hydrocarbyl, substituted hydrocarbyl, halocarbyl or substituted halocarbyl X ligand to the transition metal component) are used, or when an ionic activator is capable of extracting X, provided that the resulting activated catalyst contains at least one M-H or M-C bond into which an olefin can insert; each $R^1$ and $R^2$ is, independently, a hydrogen, a hydrocarbyl, a substituted hydrocarbyl, a halocarbyl, or a substituted halocarbyl, preferably, a $C_1$ to $C_{30}$ hydrocarbyl, a $C_1$ to $C_{30}$ substituted hydrocarbyl, a $C_1$ to $C_{30}$ halocarbyl, or a $C_1$ to $C_{30}$ substituted halocarbyl, more preferably a $C_1$ to $C_{10}$ hydrocarbyl, a $C_1$ to $C_{10}$ substituted hydrocarbyl, a $C_1$ to $C_{10}$ halocarbyl, or a $C_1$ to $C_{10}$ substituted halocarbyl, a halogen, an alkoxide, a sulfide, an amide, a phosphide, a silyl or another anionic heteroatom-containing group; or independently, may join together to form a $C_4$ to $C_{62}$ cyclic or polycyclic ring structure; n is 1, 2, or 3 such that w+n=4; additionally in the case where n>1, the ligands (in this case the organic fragment containing $R^1$, $R^2$, N, and O) may be linked together to form a potentially tetradentate, dianionic ligand; L is a neutral ligand bonded to M that may include molecules such as but not limited to pyridine, acetonitrile, diethyl ether, tetrahydrofuran, dimethylaniline, trimethylamine, tributylamine, trimethylphosphine, triphenylphosphine, lithium chloride, ethylene, propylene, butene, octene, styrene, and the like; and m is 0, 1, or 2 and indicates the absence or presence of L, provided that when R is $^t$Butyl then R is not dimethylphenyl, provided that when $R^2$ is t-butyl, then $R^1$ is not 2,6-dimethyl phenyl and X is not Cl.

2. The process according to paragraph 1, wherein M is titanium, or M is zirconium, or M is hafnium.
3. The process according to paragraph 1 or 2, wherein X is selected from the group consisting of fluoride, chloride, bromide, iodide, methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, hydride, phenyl, benzyl, phenethyl, tolyl, trimethylsilylmethyl, bis(trimethylsilyl)methyl, methoxy, ethoxy, propoxy, butoxy, dimethylamido, diethylamido, methylethylamido, phenoxy, benzoxy, and allyl.
4. The process according to paragraph 1 or 2 wherein each X is benzyl, or each X is chloride, or each X is dimethylamido.
5. The process according to any of paragraphs 1 to 4, wherein each $R^1$, $R^2$, is, independently, a hydrogen, a $C_1$ to $C_{30}$ hydrocarbyl, a $C_1$ to $C_{30}$ substituted hydrocarbyl, a $C_1$ to $C_{30}$ halocarbyl, a $C_1$ to $C_{30}$ substituted halocarbyl, a halogen, an alkoxide, a sulfide, an amide, a phosphide, a silyl or another anionic heteroatom-containing group; or independently, may join together to form a $C_4$ to $C_{62}$ cyclic or polycyclic ring structure.
6. The process according to any of paragraphs 1 to 4 wherein each $R^1$, $R^2$ is, independently, a hydrogen, a $C_1$ to $C_{10}$ hydrocarbyl, a $C_1$ to $C_{10}$ substituted hydrocarbyl, a $C_1$ to $C_{10}$ halocarbyl, a $C_1$ to $C_{10}$ substituted halocarbyl, a halogen, an alkoxide, a sulfide, an amide, a phosphide, a silyl or another anionic heteroatom-containing group; or independently, may join together to form a $C_4$ to $C_{62}$ cyclic or polycyclic ring structure.
7. The process according to any of paragraphs 1 to 6, wherein L is selected from the group consisting of pyridine, acetonitrile, diethyl ether, tetrahydrofuran, dimethylaniline, trimethylamine, tributylamine, trimethylphosphine, triphenylphosphine, lithium chloride, ethylene, propylene, butene, octene, and styrene.
8. The process according to paragraph 1, wherein: $R^1$ is 2,6-diisopropylphenyl; $R^2$ is phenyl; each X is dimethylamido; and m is 0.
9. The process according to paragraph 1, wherein: $R^1$ is 2,6-dimethylphenyl; $R^2$ is phenyl; each X is chloro; and m is 0.
10. The process according to paragraph 1, wherein: $R^1$ is 2,6-diisopropylphenyl; $R^2$ is phenyl; each X is chloro; and m is 0.
11. The process according to paragraph 1, wherein: $R^1$ is 2,6-diisopropylphenyl; $R^2$ is pentafluorophenyl; each X is chloro; and m is 0.
12. The process according to paragraph 1, wherein: $R^1$ is 2,6-diisopropylphenyl; $R^2$ is tert-butyl; each X is dimethylamido; and m is 0.
13. The process according to paragraph 1, wherein: $R^1$ is tert-butyl; $R^2$ is phenyl; each X is dimethylamido; and m is 0.
14. The process according to paragraph 8, 9, 10, 11, 12 or 13, wherein M is titanium, zirconium, or hafnium.
15. A process for polymerization comprising contacting ethylene and optionally one or more unsaturated monomers with a catalyst compound represented by any of paragraphs 1 to 14.
16. A process for polymerization comprising contacting ethylene and optionally one or more unsaturated monomers with a catalyst compound represented by the structure:

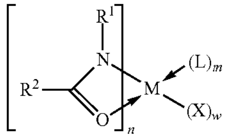

wherein M is a Group 4 transition metal (Ti, Zr or Hf);

N is nitrogen;

O is oxygen;

each X is, independently, a hydride, a halogen, a hydrocarbyl, a substituted hydrocarbyl, a halocarbyl, or a substituted halocarbyl;

w is 1, 2 or 3;

X may be independently selected from halogen, alkoxide, aryloxide, amide, phosphide, or other anionic ligand when Lewis-acid activators (such as methylalumoxane, aluminum alkyls, alkylaluminum alkoxides) or alkylaluminum halides (capable of donating a hydride, hydrocarbyl, substituted hydrocarbyl, halocarbyl or substituted halocarbyl X ligand to the transition metal component) are used, or when an ionic activator is capable of extracting X, provided that the resulting activated catalyst contains at least one M-H or M-C bond into which an olefin can insert;

each $R^1$ and $R^2$ is, independently, a hydrogen, a hydrocarbyl, a substituted hydrocarbyl, a halocarbyl, or a substituted halocarbyl, preferably, a $C_1$ to $C_{30}$ hydrocarbyl, a $C_1$ to $C_{30}$ substituted hydrocarbyl, a $C_1$ to $C_{30}$ halocarbyl, or a $C_1$ to $C_{30}$ substituted halocarbyl, more preferably a $C_1$ to $C_{10}$ hydrocarbyl, a $C_1$ to $C_{10}$ substituted hydrocarbyl, a $C_1$ to $C_{10}$ halocarbylbyl, or a $C_1$ to $C_{10}$ substituted halocarbyl, a halogen, an alkoxide, a sulfide, an amide, a phosphide, a silyl or another anionic heteroatom-containing group; or independently, may join together to form a $C_4$ to $C_{62}$ cyclic or polycyclic ring structure;

n is 1, 2, or 3 such that w+n=4;

additionally in the case where n>1, the ligands (in this case the organic fragment containing $R^1$, $R^2$, N, and O) may be linked together to form a potentially tetradentate, dianionic ligand;

L is a neutral ligand bonded to M that may include molecules such as but not limited to pyridine, acetonitrile, diethyl ether, tetrahydrofuran, dimethylaniline, trimethylamine, tributylamine, trimethylphosphine, triphenylphosphine, lithium chloride, ethylene, propylene, butene, octene, styrene, and the like; and m is 0, 1, or 2 and indicates the absence or presence of L, provided that when R is $^t$Butyl then R is not 2,6-dimethylphenyl and X is not Cl, provided that when $R^1$ is phenyl or substituted alkyl, then $R^2$ is not a $C_1$ to $C_4$ alkyl.

17. A process for polymerization comprising contacting ethylene and optionally one or more unsaturated monomers with a catalyst compound represented by the structure:

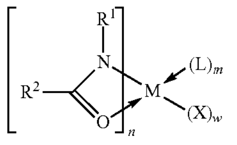

wherein M is a Group 4 transition metal (Ti, Zr or Hf);

N is nitrogen;

O is oxygen;

each X is, independently, a hydride, a halogen, a hydrocarbyl, a substituted hydrocarbyl, a halocarbyl, or a substituted halocarbyl;

w is 1, 2, or 3;

X may be independently selected from halogen, alkoxide, aryloxide, amide, phosphide, or other anionic ligand when Lewis-acid activators (such as methylalumoxane, aluminum alkyls, alkylaluminum alkoxides) or alkylaluminum halides (capable of donating a hydride, hydrocarbyl, substituted hydrocarbyl, halocarbyl or substituted halocarbyl X ligand to the transition metal component) are used, or when an ionic activator is capable of extracting X, provided that the resulting activated catalyst contains at least one M-H or M-C bond into which an olefin can insert;

each $R^1$ and $R^2$ is, independently, a hydrogen, a hydrocarbyl, a substituted hydrocarbyl, a halocarbyl, or a substituted halocarbyl, preferably, a $C_1$ to $C_{30}$ hydrocarbyl, a $C_1$ to $C_{30}$ substituted hydrocarbyl, a $C_1$ to $C_{30}$ halocarbyl, or a $C_1$ to $C_{30}$ substituted halocarbyl, more preferably a $C_1$ to $C_{10}$ hydrocarbyl, a $C_1$ to $C_{10}$ substituted hydrocarbyl, a $C_1$ to $C_{10}$ halocarbyl, or a $C_1$ to $C_{10}$ substituted halocarbyl, a halogen, an alkoxide, a sulfide, an amide, a phosphide, a silyl or another anionic heteroatom-containing group; or independently, may join together to form a $C_4$ to $C_{62}$ cyclic or polycyclic ring structure;

n is 1, 2, or 3 such that w+n=4;

additionally in the case where n>1, the ligands (in this case the organic fragment containing $R^1$, $R^2$, N, and O) may be linked together to form a potentially tetradentate, dianionic ligand;

L is a neutral ligand bonded to M that may include molecules such as but not limited to pyridine, acetonitrile, diethyl ether, tetrahydrofuran, dimethylaniline, trimethylamine, tributylamine, trimethylphosphine, triphenylphosphine, lithium chloride, ethylene, propylene, butene, octene, styrene, and the like; and m is 0, 1, or 2 and indicates the absence or presence of L, provided that when R is $^t$Butyl then R is not 2,6-dimethylphenyl and X is not Cl, provided that when $R^1$ is a substituted phenyl or adamantyl, then $R^2$ is not a $C_1$ to $C_6$ linear or branched alkyl.

EXAMPLES

The foregoing discussion can be further described with reference to the following non-limiting examples. Eighteen illustrative catalyst compounds (shown below), each according to one or more embodiments described, were used to polymerize ethylene monomer. All catalysts and catalyst precursors were synthesized according to methods described in the literature, specifically but not limited to: Arnold et al., *Inorg. Chem.,* 2001, 40, 6069-6072; Schafer et al., *Chem. Commun.,* 2003, 2462-2463; Schafer et al., *Organic Lett.,* 2003, 4733-4736; Schafer et al., *Can. J. Chem.,* 2005, 83, 1037-1042; Schafer et al., *Inorg. Chem.,* 2005, 44, 8680-8689; Schafer et al., *Angew. Chem. Int. Ed.,* 2007, 46, 354-358; Schafer et al., *Eur. J. Inorg. Chem.,* 2007, 2243-2255; Schafer et al., *Organometallics,* 2007, 26, 6366-6372. A general route to the complexes is outlined below. All reactions were carried out under a purified nitrogen atmosphere using standard glovebox, high vacuum or Schlenk techniques, unless otherwise noted. All solvents used were anhydrous, de-oxygenated and purified according to known procedures. All starting materials were either purchased from Aldrich and purified prior to use or prepared according to procedures known to those skilled in the art.

The syntheses of compounds A through R can be represented as follows:

1. General Ligand Synthesis:

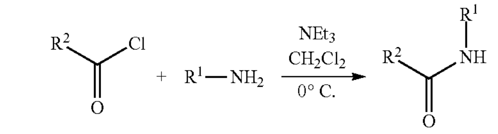

2. Synthesis of Dialkyl Derivatives A-E:

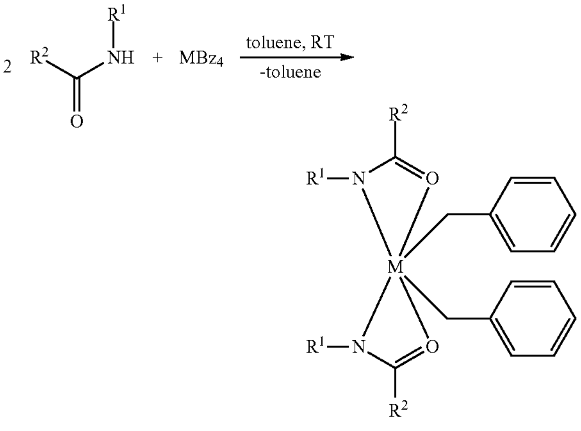

3. Synthesis of Dichloro Derivatives F-J:
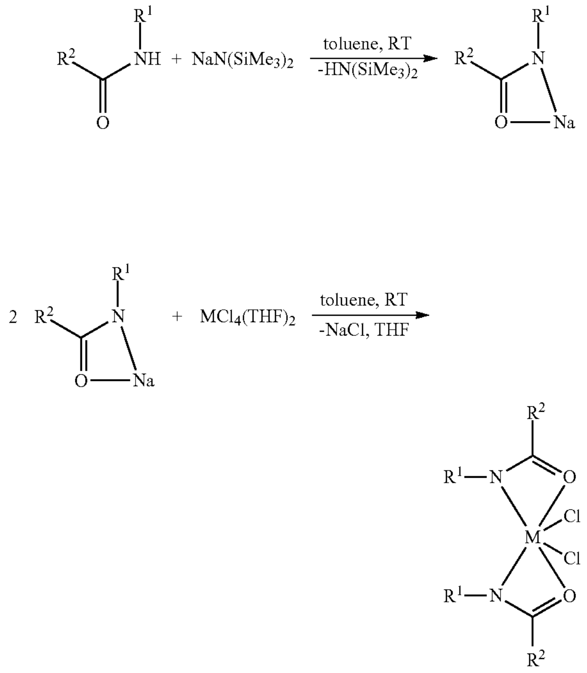
4. Synthesis of Diamido Derivatives K-R:
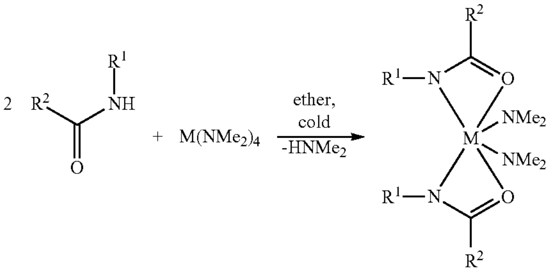
The bis-amidate metal complexes investigated in this study are detailed below:
Bis-Amidate Metal Dialkyls:
A
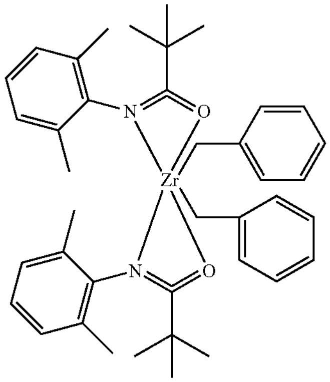
-continued
B
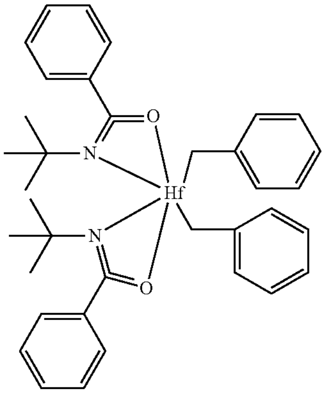
C
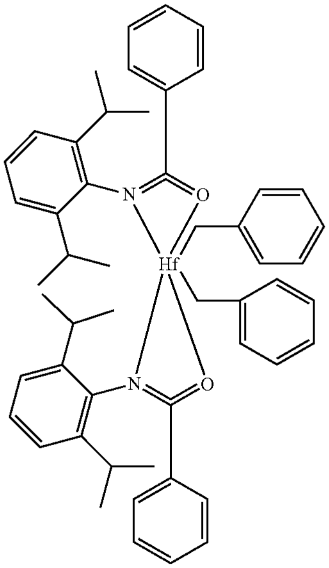
D
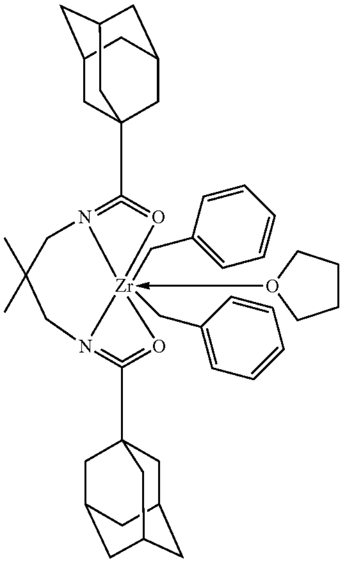

-continued
E
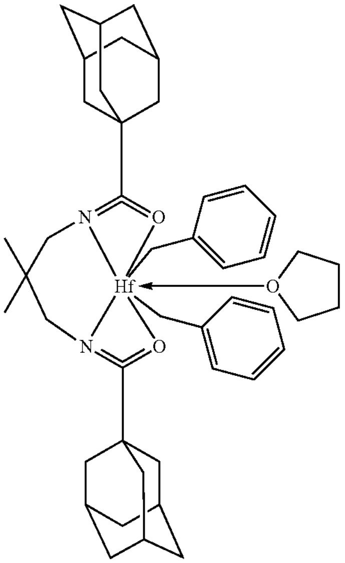
Bis-Amidate Metal Dichlorides:
F
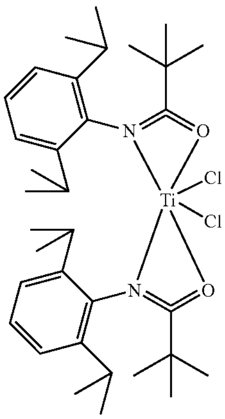
G
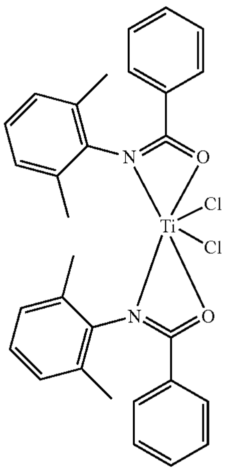
-continued
H
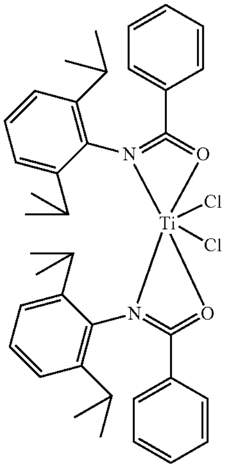
I
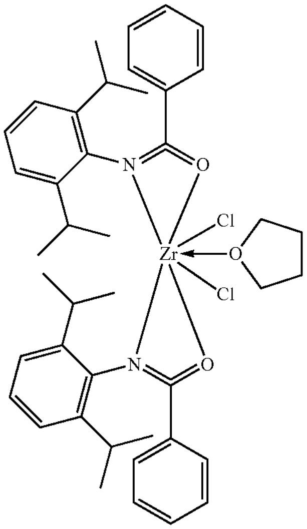
J
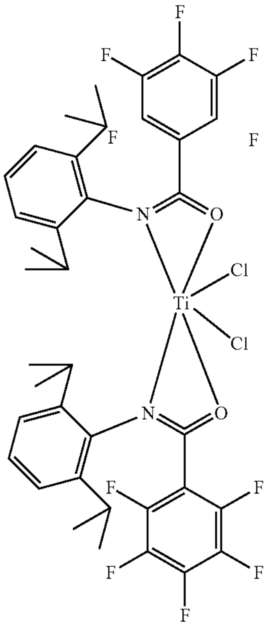

Bis-Amidate Metal Di-Amides:
K
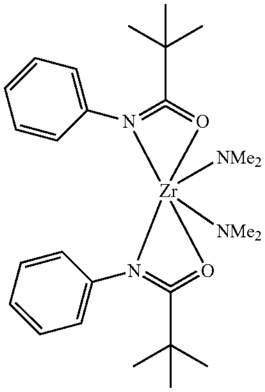
L
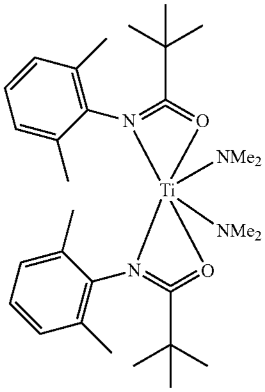
M
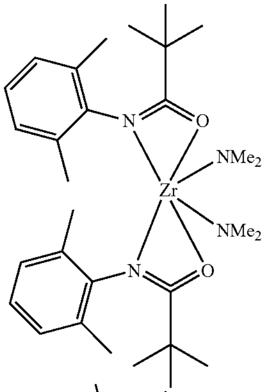
N
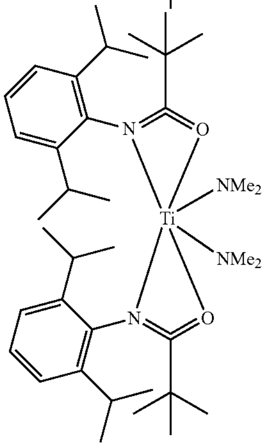
-continued
O
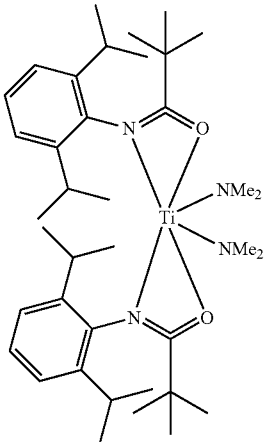
P
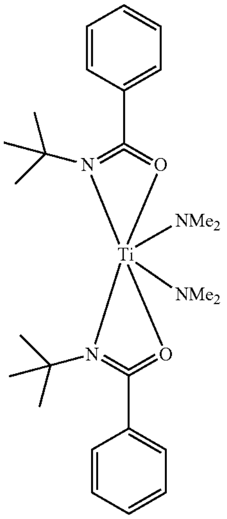
Q
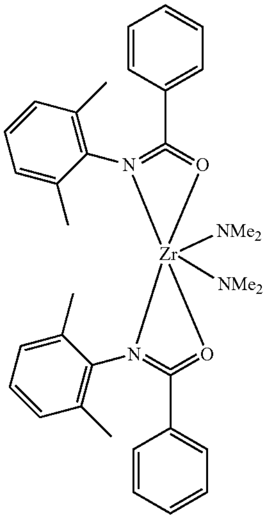

-continued

R

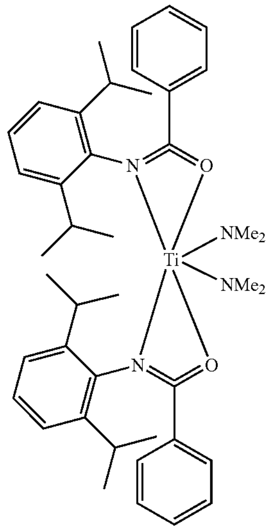

Polymerization Process:

Ethylene/1-octene copolymerizations were carried out in a parallel pressure reactor, which is described in U.S. Pat. Nos. 6,306,658, 6,455,316 and 6,489,168; international publication WO 00/09255; and Murphy et al., *J. Am. Chem. Soc.*, 2003, 125, 4306-4317, each of which is incorporated herein by reference. A pre-weighed glass vial insert and disposable stirring paddle were fitted to each reaction vessel of the reactor, which contains 48 individual reaction vessels. The reactor was then closed and each vessel was individually heated to a set temperature (usually between 50° C. and 100° C.) and pressurized to a pre-determined pressure of ethylene (generally between 75 psi and 350 psi). 100 uL of 1-octene (637 umol) was injected into each reaction vessel through a valve, followed by 500 uL of hexane. 100 uL of tri-n-octylaluminum solution (10 mmol/L in hexane, 1 umol) was then added to act as a co-catalyst/scavenger. The contents of the vessel were then stirred at 800 rpm. An activator solution (usually N,N'-dimethylanilinium tetrakis(pentafluorophenyl)borate in toluene, 0.40 mmol/L, ~1 equiv) was then injected into the reaction vessel along with 500 uL hexane, followed by a toluene solution of catalyst (dialkyls A-E, 0.40 mmol/L, 20-120 nmol) and another aliquot of hexane (500 uL). In the case of the dichlorides F-J and the diamides K-R, the tri-n-octylaluminum scavenger/co-catalyst and activator solutions were replaced with a toluene solution containing 500 equivalents of methylalumoxane or modified methylalumoxane. In a typical run, reaction conditions were varied such that two temperatures, three pressures and four catalyst concentrations were investigated. All runs were performed in duplicate. The reaction was then allowed to proceed until a set time limit (usually 30 min) or until a set amount of ethylene had been taken up by the reaction (ethylene pressure was maintained in each reaction vessel at the pre-set level by computer control). At this point, the reaction was quenched by exposure to air. After the polymerization reaction, the glass vial insert containing the polymer product and solvent was removed from the pressure cell and the inert atmosphere glovebox and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight, by FT-IR (see below) to determine comonomer incorporation, and by DSC (see below) to determine melting point.

High temperature size exclusion chromatography was performed using an automated "Rapid GPC" system as described in U.S. Pat. Nos. 6,491,816; 6,491,823; 6,475,391; 6,461,515; 6,436,292; 6,406,632; 6,175,409; 6,454,947; 6,260,407; and 6,294,388; each of which is incorporated herein by reference. This apparatus has a series of three 30 cm×7.5 mm linear columns, each containing PLgel 10 um, Mix B. The GPC system was calibrated using polystyrene standards ranging from 580 g/mol to 3,390,000 g/mol. The system was operated at an eluent flow rate of 2.0 mL/min and an oven temperature of 165° C. 1,2,4-trichlorobenzene was used as the eluent. The polymer samples were dissolved in 1,2,4-trichlorobenzene at a concentration of 0.1 mg/mL to 0.9 mg/mL. 250 uL of a polymer solution were injected into the system. The concentration of the polymer in the eluent was monitored using an evaporative light scattering detector. The molecular weights obtained are relative to linear polystyrene standards.

Differential Scanning calorimetry (DSC) measurements were performed on a TA-Q100 instrument to determine the melting point of the polymers. Samples were pre-annealed at 220° C. for 15 minutes and then allowed to cool to room temperature overnight. The samples were then heated to 220° C. at a rate of 100° C./min and then cooled at a rate of 50° C./min. Melting points were collected during the heating period.

The ratio of 1-octene to ethylene incorporated in the polymers (weight %) was determined by rapid FT-IR spectroscopy on a Bruker Equinox 55+ IR in reflection mode. Samples were prepared in a thin film format by evaporative deposition techniques. Weight % 1-octene was obtained from the ratio of peak heights at 1378 and 4322 $cm^{-1}$. This method was calibrated using a set of ethylene/1-octene copolymers with a range of known wt % 1-octene content.

Polymerization data shown in Table 1 is intended to be representative of the catalytic behavior of the catalyst compounds and not comprehensive.

TABLE 1

Selected High Throughput Polymerization Results

| Example | Catalyst | Amount (nmol) | Temp (° C.) | Pressure (psi) | Time (sec) | Yield (mg) | Activity (g/mmol h bar) | Mw (kDa) | MWD (Mw/Mn) | DSC Tm (° C.) |
|---|---|---|---|---|---|---|---|---|---|---|
| 1 | A | 80 | 50 | 75 | 1801 | 10 | 50 | 293 | 1.5 | ND |
| 2 | A | 80 | 50 | 200 | 1801 | 31 | 56 | 307 | 1.5 | 128 |
| 3 | A | 80 | 50 | 350 | 1801 | 54 | 55 | 811 | 6.8 | 131 |
| 4 | A | 80 | 80 | 75 | 1801 | 46 | 222 | 274 | 2.4 | 124 |
| 5 | A | 80 | 80 | 200 | 1394 | 90 | 210 | 715 | 9 | 128 |
| 6 | A | 80 | 80 | 350 | 1007 | 97 | 180 | 876 | 5.5 | 131 |
| 7 | B | 80 | 50 | 200 | 1800 | 0 | 0 | ND | ND | ND |

TABLE 1-continued

Selected High Throughput Polymerization Results

| Example | Catalyst | Amount (nmol) | Temp (° C.) | Pressure (psi) | Time (sec) | Yield (mg) | Activity (g/mmol h bar) | Mw (kDa) | MWD (Mw/Mn) | DSC Tm (° C.) |
|---|---|---|---|---|---|---|---|---|---|---|
| 8 | B | 80 | 80 | 200 | 1800 | 0 | 0 | ND | ND | ND |
| 9 | C | 80 | 50 | 75 | 1800 | 0 | 0 | ND | ND | ND |
| 10 | C | 80 | 50 | 200 | 1800 | 0 | 0 | ND | ND | ND |
| 11 | C | 80 | 50 | 350 | 1800 | 1 | 1 | ND | ND | ND |
| 12 | C | 80 | 80 | 75 | 1800 | 1 | 1 | ND | ND | ND |
| 13 | C | 80 | 80 | 200 | 1800 | 3 | 5 | ND | ND | ND |
| 14 | C | 80 | 80 | 350 | 1800 | 6 | 8 | ND | ND | ND |
| 15 | D | 80 | 50 | 200 | 1800 | 0 | 0 | ND | ND | ND |
| 16 | D | 80 | 80 | 200 | 1800 | 0 | 0 | ND | ND | ND |
| 17 | E | 80 | 50 | 200 | 1800 | 0 | 0 | ND | ND | ND |
| 18 | E | 80 | 80 | 200 | 1800 | 0 | 0 | ND | ND | ND |
| 25 | F | 40 | 50 | 75 | 1800 | 10 | 98 | 2650 | 2.2 | 128 |
| 26 | F | 40 | 50 | 200 | 1800 | 23 | 81 | 3770 | 1.7 | 132 |
| 27 | F | 40 | 50 | 350 | 1800 | 39 | 80 | 3943 | 1.7 | 133 |
| 28 | F | 40 | 80 | 75 | 1800 | 5 | 44 | ND | ND | ND |
| 29 | F | 40 | 80 | 200 | 1800 | 16 | 59 | 2045 | 3.4 | 130 |
| 30 | F | 40 | 80 | 350 | 1800 | 39 | 81 | 3012 | 2.9 | 131 |
| 31 | G | 40 | 50 | 75 | 1800 | 9 | 88 | ND | ND | ND |
| 32 | G | 40 | 50 | 200 | 1800 | 32 | 116 | 4369 | 1.7 | 132 |
| 33 | G | 40 | 50 | 350 | 1800 | 67 | 138 | 4242 | 1.9 | 132 |
| 34 | G | 40 | 80 | 75 | 1800 | 4 | 36 | ND | ND | ND |
| 35 | G | 40 | 80 | 200 | 1800 | 15 | 55 | 2396 | 5 | 130 |
| 36 | G | 40 | 80 | 350 | 1800 | 25 | 53 | 3669 | 3.3 | ND |
| 37 | H | 40 | 50 | 75 | 1800 | 16 | 152 | 2428 | 2.2 | 130 |
| 38 | H | 40 | 50 | 200 | 1800 | 50 | 180 | 3317 | 2.2 | 129 |
| 39 | H | 40 | 50 | 350 | 593 | 69 | 429 | 3865 | 2.1 | 131 |
| 40 | H | 40 | 80 | 75 | 1800 | 5 | 47 | ND | ND | ND |
| 41 | H | 40 | 80 | 200 | 1800 | 21 | 75 | 2348 | 3.2 | 130 |
| 42 | H | 40 | 80 | 350 | 1800 | 46 | 95 | 3197 | 2.3 | 132 |
| 43 | I | 40 | 50 | 75 | 1800 | 2 | 15 | ND | ND | ND |
| 44 | I | 40 | 50 | 200 | 1800 | 5 | 17 | ND | ND | ND |
| 45 | I | 40 | 50 | 350 | 1800 | 8 | 16 | ND | ND | ND |
| 46 | I | 40 | 80 | 75 | 1800 | 2 | 17 | ND | ND | ND |
| 47 | I | 40 | 80 | 200 | 1800 | 7 | 24 | ND | ND | ND |
| 48 | I | 40 | 80 | 350 | 1800 | 14 | 30 | 2196 | 5.7 | ND |
| 49 | J | 40 | 50 | 75 | 1800 | 9 | 83 | ND | ND | ND |
| 50 | J | 40 | 50 | 200 | 1800 | 30 | 108 | 3069 | 1.7 | 131 |
| 51 | J | 40 | 50 | 350 | 1800 | 59 | 121 | 3891 | 1.3 | 131 |
| 52 | J | 40 | 80 | 75 | 1800 | 7 | 66 | ND | ND | ND |
| 53 | J | 40 | 80 | 200 | 1800 | 30 | 107 | 3373 | 1.6 | 130 |
| 54 | J | 40 | 80 | 350 | 1800 | 115 | 240 | 4636 | 1.3 | 131 |
| 55 | K | 40 | 50 | 200 | 1800 | 20 | 74 | 1555 | 6.1 | 135 |
| 56 | K | 40 | 80 | 200 | 1800 | 18 | 65 | 1028 | 6.7 | 132 |
| 57 | L | 40 | 50 | 200 | 1800 | 7 | 25 | ND | ND | ND |
| 58 | L | 40 | 80 | 200 | 1800 | 19 | 69 | 3358 | 5.4 | 130 |
| 59 | M | 40 | 50 | 200 | 1800 | 2 | 7 | ND | ND | ND |
| 60 | M | 40 | 80 | 200 | 1800 | 13 | 47 | 820 | 11.4 | 130 |
| 61 | N | 40 | 50 | 200 | 1800 | 20 | 75 | 3931 | 1.5 | 130 |
| 62 | N | 40 | 80 | 200 | 1800 | 54 | 213 | 3532 | 1.6 | 130 |
| 63 | O | 40 | 50 | 200 | 1800 | 3 | 9 | ND | ND | ND |
| 64 | O | 40 | 80 | 200 | 1800 | 10 | 37 | 932 | 12.9 | 132 |
| 65 | P | 40 | 50 | 200 | 1660 | 20 | 71 | 3540 | 3.2 | 131 |
| 66 | P | 40 | 80 | 200 | 1503 | 35 | 127 | 3029 | 4.5 | 129 |
| 67 | Q | 40 | 50 | 200 | 1800 | 12 | 42 | 2477 | 2.3 | 134 |
| 68 | Q | 40 | 80 | 200 | 1800 | 14 | 52 | 932 | 5 | 130 |
| 69 | R | 40 | 50 | 200 | 1800 | 10 | 35 | ND | ND | ND |
| 70 | R | 40 | 80 | 200 | 1800 | 19 | 68 | 448 | 2.9 | 131 |

ND = not determined

While the foregoing is directed to embodiments of the present invention, other and further embodiments of the invention may be devised without departing from the basic scope thereof, and the scope thereof is determined by the claims that follow.

All documents described herein are incorporated by reference herein for purposes of all jurisdictions where such practice is allowed, including any priority documents, related applications, and/or testing procedures to the extent they are not inconsistent with this text, provided however that any priority document not named in the initially filed application or filing documents is NOT incorporated by reference herein.

As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term “comprising” is considered synonymous with the term “including” for purposes of Australian law. Likewise whenever a composition, an element or a group of elements is preceded with the transitional phrase “comprising,” it is understood that we also contemplate the same composition or group of elements with transitional phrases “consisting essentially of,” “consisting of,” “selected from the group of consisting of," or "is" preceding the recitation of the composition, element, or elements and vice versa.

What is claimed is:

1. A process for polymerization comprising contacting ethylene and optionally one or more unsaturated monomers with an activator comprising a non-coordinating anion and a catalyst compound represented by the structure:

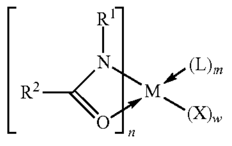

wherein M is a Group 4 transition metal;

N is nitrogen;

O is oxygen;

each X is, independently, selected from the group consisting of fluoride, chloride, bromide, iodide, methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, hydride, phenyl, benzyl, phenethyl, tolyl, trimethylsilylmethyl, bis(trimethylsilyl)methyl, methoxy, ethoxy, propoxy, butoxy, dimethylamido, diethylamido, methylethylamido, phenoxy, benzoxy, and allyl;

w is 1, 2, or 3;

each $R^1$ and $R^2$ is, independently, a hydrogen, a hydrocarbyl, a substituted hydrocarbyl, a halocarbyl, or a substituted halocarbyl, a halogen, an alkoxide, a sulfide, an amide, a phosphide, or a silyl; or independently, may join together to form a $C_4$ to $C_{62}$ cyclic or polycyclic ring structure;

n is 2 or 3 such that w+n=4;

additionally in the case where n>1, the ligands (defined to be the organic fragment containing $R^1$, $R^2$, N, and O) may be linked together to form a potentially tetradentate, dianionic ligand;

L is a neutral ligand bonded to M; and m is 0, 1, or 2 and indicates the absence or presence of L, provided that when $R^2$ is t-butyl, then $R^1$ is not 2,6-dimethyl phenyl and X is not Cl.

2. The process according to claim 1, wherein M is titanium.

3. The process according to claim 1, wherein M is zirconium.

4. The process according to claim 1, wherein M is hafnium.

5. The process according to claim 1, wherein X is selected from the group consisting of fluoride, chloride, bromide, iodide, methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, hydride, phenyl, benzyl, phenethyl, tolyl, trimethylsilylmethyl, bis(trimethylsilyl)methyl, methoxy, ethoxy, propoxy, butoxy, dimethylamido, diethylamido, methylethylamido, phenoxy, and benzoxy.

6. The process according to claim 1, wherein each X is benzyl.

7. The process according to claim 1, wherein each X is chloride.

8. The process according to claim 1, wherein each X is dimethylamido.

9. The process according to claim 1, wherein each $R^1$, $R^2$, is, independently, a hydrogen, a $C_1$ to $C_{30}$ hydrocarbyl, a $C_1$ to $C_{30}$ substituted hydrocarbyl, a $C_1$ to $C_{30}$ halocarbyl, a $C_1$ to $C_{30}$ substituted halocarbyl, a halogen, an alkoxide, a sulfide, an amide, a phosphide, or a silyl; or independently, may join together to form a $C_4$ to $C_{62}$ cyclic or polycyclic ring structure.

10. The process according to claim 1, wherein each $R^1$, $R^2$ is, independently, a hydrogen, a $C_1$ to $C_{10}$ hydrocarbyl, a $C_1$ to $C_{10}$ substituted hydrocarbyl, a $C_1$ to $C_{10}$ halocarbyl, a $C_1$ to $C_{10}$ substituted halocarbyl, a halogen, an alkoxide, a sulfide, an amide, a phosphide, or a silyl; or independently, may join together to form a $C_4$ to $C_{62}$ cyclic or polycyclic ring structure.

11. The process according to claim 1, wherein L is selected from the group consisting of pyridine, acetonitrile, diethyl ether, tetrahydrofuran, dimethylaniline, trimethylamine, tributylamine, trimethylphosphine, triphenylphosphine, lithium chloride, ethylene, propylene, butene, octene, and styrene.

12. The process according to claim 1, wherein:

$R^1$ is 2,6-diisopropylphenyl;

$R^2$ is phenyl;

each X is dimethylamido; and m is 0.

13. The process according to claim 12, wherein M is titanium.

14. The process according to claim 12, wherein M is zirconium.

15. The process according to claim 12, wherein M is hafnium.

16. The process according to claim 1, wherein:

$R^1$ is 2,6-dimethylphenyl;

$R^2$ is phenyl;

each X is chloro; and m is 0.

17. The process according to claim 16, wherein M is titanium.

18. The process according to claim 16, wherein M is zirconium.

19. The process according to claim 16, wherein M is hafnium.

20. The process according to claim 1, wherein:

$R^1$ is 2,6-diisopropylphenyl;

$R^2$ is phenyl;

each X is chloro; and m is 0.

21. The process according to claim 20, wherein M is titanium.

22. The process according to claim 20, wherein M is zirconium.

23. The process according to claim 20, wherein M is hafnium.

24. The process according to claim 1, wherein:

$R^1$ is 2,6-diisopropylphenyl;

$R^2$ is pentafluorophenyl;

each X is chloro; and m is 0.

25. The process according to claim 24, wherein M is titanium.

26. The process according to claim 24, wherein M is zirconium.

27. The process according to claim 24, wherein M is hafnium.

28. The process according to claim 1, wherein:

$R^1$ is 2,6-diisopropylphenyl;

$R^2$ is tert-butyl;

each X is dimethylamido; and m is 0.

29. The process according to claim 28, wherein M is titanium.

30. The process according to claim 28, wherein M is zirconium.

31. The process according to claim 28, wherein M is hafnium.

32. The process according to claim 1, wherein:

$R^1$ is tert-butyl;

$R^2$ is phenyl;

each X is dimethylamido; and m is 0.

33. The process according to claim 32, wherein M is titanium.

34. The process according to claim 32, wherein M is zirconium.

35. The process according to claim 32, wherein M is hafnium.

36. The process of claim 1 wherein M is Ti, Zr or Hf.

37. The process of claim 1 wherein L is a neutral ligand bonded to M that includes pyridine, acetonitrile, diethyl ether, tetrahydrofuran, dimethylaniline, trimethylamine, tributylamine, trimethylphosphine, triphenylphosphine, lithium chloride, ethylene, propylene, butene, octene, or styrene.

38. The process of claim 1 wherein the activator is represented by the formula:

$$(Z)_d+(A^{d-})$$

wherein Z is (L-H) or a reducible Lewis Acid, L is a neutral Lewis base; H is hydrogen; (L-H)+ is a Bronsted acid; $A^{d-}$ is a non-coordinating anion having the charge d−; and d is an integer from 1 to 3.

39. The process of claim 1 wherein the activator is selected from the group consisting of: trimethylammonium tetrakis(perfluoronaphthyl)borate; triethylammonium tetrakis(perfluoronaphthyl)borate; tripropylammonium tetrakis(perfluoronaphthyl)borate; tri(n-butyl)ammonium tetrakis(perfluoronaphthyl)borate; tri(t-butyl)ammonium tetrakis(perfluoronaphthyl)borate; N,N-dimethylanilinium tetrakis(perfluoronaphthyl)borate; N,N-diethylanilinium tetrakis(perfluoronaphthyl)borate; N,N-dimethyl-(2,4,6-trimethylanilinium) tetrakis(perfluoronaphthyl)borate; tropylium tetrakis(perfluoronaphthyl)borate; triphenylcarbenium tetrakis(perfluoronaphthyl)borate; triphenylphosphonium tetrakis(perfluoronaphthyl)borate; triethylsilylium tetrakis(perfluoronaphthyl)borate; benzene(diazonium) tetrakis(perfluoronaphthyl)borate; trimethylammonium tetrakis(perfluorobiphenyl)borate; triethylammonium tetrakis(perfluorobiphenyl)borate; tripropylammonium tetrakis(perfluorobiphenyl)borate; tri(n-butyl)ammonium tetrakis(perfluorobiphenyl)borate; tri(t-butyl)ammonium tetrakis(perfluorobiphenyl)borate; N,N-dimethylanilinium tetrakis(perfluorobiphenyl)borate; N,N-diethylanilinium tetrakis(perfluorobiphenyl)borate; N,N-dimethyl-(2,4,6-trimethylanilinium) tetrakis(perfluorobiphenyl)borate; tropylium tetrakis(perfluorobiphenyl)borate; triphenylcarbenium tetrakis(perfluorobiphenyl)borate; triphenylphosphonium tetrakis(perfluorobiphenyl)borate; triethylsilylium tetrakis(perfluorobiphenyl)borate; benzene(diazonium) tetrakis(perfluorobiphenyl)borate.

40. The process of claim 1 wherein the activator is selected from the group consisting of: trimethylammonium tetraphenylborate; triethylammonium tetraphenylborate; tripropylammonium tetraphenylborate; tri(n-butyl)ammonium tetraphenylborate; tri(t- butyl)ammonium tetraphenylborate; N,N-dimethylanilinium tetraphenylborate; N,N- diethylanilinium tetraphenylborate; N,N-dimethyl-(2,4,6-trimethylanilinium)tetraphenylborate; tropylium tetraphenylborate; triphenylcarbenium tetraphenylborate; triphenylphosphonium tetraphenylborate triethylsilylium tetraphenylborate; benzene(diazonium)tetraphenylborate; trimethylammonium tetrakis(pentafluorophenyl)borate; triethylammonium tetrakis(pentafluorophenyl)borate; tripropylammonium tetrakis(pentafluorophenyl)borate; tri(n-butyl)ammonium tetrakis(pentafluorophenyl)borate; tri(sec-butyl)ammonium tetrakis(pentafluorophenyl)borate; N,N-dimethylanilinium tetrakis(pentafluorophenyl)borate; N,N-diethylanilinium tetrakis(pentafluorophenyl)borate; N,N-dimethyl-(2,4,6-trimethylanilinium) tetrakis(pentafluorophenyl)borate; tropylium tetrakis(pentafluorophenyl)borate; triphenylcarbenium tetrakis(pentafluorophenyl)borate; triphenylphosphonium tetrakis(pentafluorophenyl)borate;

triethylsilylium tetrakis(pentafluorophenyl)borate; benzene(diazonium) tetrakis(pentafluorophenyl)borate; trimethylammonium tetrakis-(2,3,4,6-tetrafluorophenyl) borate; triethylammonium tetrakis-(2,3,4,6- tetrafluorophenyl)borate; tripropylammonium tetrakis-(2,3,4,6-tetrafluorophenyl)borate; tri(n-butyl)ammonium tetrakis-(2,3,4,6-tetrafluoro-phenyl)borate; dimethyl(t-butyl)ammonium tetrakis-(2,3,4,6-tetrafluorophenyl) borate ; N,N-dimethylanilinium tetrakis-(2,3,4,6-tetrafluorophenyl)borate;

N,N-diethylanilinium tetrakis-(2,3,4,6- tetrafluorophenyl) borate; N,N-dimethyl-(2,4,6-trimethylanilinium)tetrakis-(2,3,4,6- tetrafluorophenyl)borate; tropylium tetrakis-(2,3,4,6-tetrafluorophenyl)borate; triphenylcarbenium tetrakis-(2,3,4,6-tetrafluorophenyl) borate ; triphenylphosphonium tetrakis-(2,3,4,6-tetrafluorophenyl)borate; triethylsilylium tetrakis-(2,3,4,6-tetrafluorophenyl)borate; benzene(diazonium) tetrakis-(2,3,4,6-tetrafluorophenyl)borate; trimethylammonium tetrakis(perfluoronaphthyl)borate; triethylammonium tetrakis(perfluoronaphthyl)borate; tripropylammonium tetrakis(perfluoronaphthyl)borate; tri(n-butyl)ammonium tetrakis(perfluoronaphthyl)borate; tri(t-butyl)ammonium tetrakis(perfluoronaphthyl)borate; N,N-dimethylanilinium tetrakis(perfluoronaphthyl)borate; N,N-diethylanilinium tetrakis(perfluoronaphthyl) borate; N,N-dimethyl-(2,4,6-trimethylanilinium) tetrakis(perfluoronaphthyl)borate; tropylium tetrakis(perfluoronaphthyl)borate; triphenylcarbenium tetrakis(perfluoronaphthyl)borate; triphenylphosphonium tetrakis(perfluoronaphthyl)borate; triethylsilylium tetrakis(perfluoronaphthyl)borate; benzene(diazonium) tetrakis(perfluoronaphthyl)borate; trimethylammonium tetrakis(perfluorobiphenyl)borate; triethylammonium tetrakis(perfluorobiphenyl)borate; tripropylammonium tetrakis(perfluorobiphenyl)borate; tri(n-butyl)ammonium tetrakis(perfluorobiphenyl)borate; tri(t-butyl)ammonium tetrakis(perfluorobiphenyl)borate; N,N-dimethylanilinium tetrakis(perfluorobiphenyl)borate; N,N-diethylanilinium tetrakis(perfluorobiphenyl)borate; N,N-dimethyl-(2,4,6-trimethylanilinium) tetrakis(perfluorobiphenyl)borate; tropylium tetrakis(perfluorobiphenyl)borate; triphenylcarbenium tetrakis(perfluorobiphenyl)borate; triphenylphosphonium tetrakis(perfluorobiphenyl)borate; triethylsilylium tetrakis(perfluorobiphenyl)borate; benzene(diazonium) tetrakis(perfluorobiphenyl)borate; trimethylammonium tetrakis(3,5-bis(trifluoromethyl)phenyl)borate; triethylammonium tetrakis(3,5-bis(trifluoromethyl)phenyl) borate; tripropylammonium tetrakis(3,5-bis(trifluoromethyl)phenyl)borate; tri(n-butyl)ammonium tetrakis (3,5-bis(trifluoromethyl)phenyl)borate; tri(t-butyl)ammonium tetrakis(3,5-bis(trifluoromethyl)phenyl)borate; N,N-dimethylanilinium tetrakis (3,5-bis(trifluoromethyl)phenyl)borate; N,N-diethylanilinium tetrakis (3,5-bis(trifluoromethyl)phenyl)borate; N,N-dimethyl-(2,4,6-trimethylanilinium) tetrakis(3,5-bis (trifluoromethyl)phenyl)borate; tropylium tetrakis(3,5-bis(trifluoromethyl)phenyl)borate; triphenylcarbenium tetrakis (3,5-bis(trifluoromethyl)phenyl)borate; triphenylphosphonium tetrakis(3,5-bis(trifluoromethyl)phenyl)borate; triethylsilylium tetrakis (3,5-bis(trifluoromethyl)phenyl)borate; benzene (diazonium) tetrakis (3,5-bis(trifluoromethyl)phenyl)borate; di-(i-propyl) ammonium tetrakis(pentafluorophenyl)borate; dicyclohexylammonium tetrakis(pentafluorophenyl) borate; tri(o-tolyl)phosphonium tetrakis(pentafluorophenyl)borate, and tri(2,6-dimethylphenyl)phosphonium tetrakis(pentafluorophenyl)borate.

41. The process of claim 1 wherein the activator is selected from the group consisting of:

N,N-dimethylanilinium tetrakis(perfluoronaphthyl)borate;

N,N-dimethylanilinium tetrakis(perfluorobiphenyl)borate;

N,N-dimethylanilinium tetrakis(3,5-bis(trifluoromethyl) phenyl)borate; triphenylcarbenium tetrakis(perfluoronaphthyl)borate; triphenylcarbenium tetrakis(perfluorobiphenyl)borate; triphenylcarbenium tetrakis(3,5-bis(trifluoromethyl)phenyl)borate; triphenylcarbenium tetrakis(perfluorophenyl)borate; $[Me_3NH^+][B(C_6F_5)_4]$; 1-(4-(tris(pentafluorophenyl)borate)-2,3,5,6-tetrafluorophenyl)pyrrolidinium; and 4-(tris(pentafluorophenyl) borate)-2,3,5,6- tetrafluoropyridine.

42. The process of claim 1 wherein the activator is selected from the group consisting of: triphenylcarbenium tetraphenylborate, triphenylcarbenium tetrakis(pentafluorophenyl) borate, triphenylcarbenium tetrakis-(2,3,4,6-tetrafluorophenyl)borate, triphenylcarbenium tetrakis(perfluoronaphthyl) borate, triphenylcarbenium tetrakis(perfluorobiphenyl) borate, and triphenylcarbenium tetrakis(3,5-bis (trifluoromethyl)phenyl)borate).

43. The process of claim 1 wherein the activator comprises one or more of trialkylammonium tetrakis(pentafluorophenyl)borate; N,N-dialkylanilinium tetrakis(pentafluorophenyl)borate; N,N-dimethyl-(2,4,6-trimethylanilinium) tetrakis(pentafluorophenyl)borate; trialkylammonium tetrakis-(2, 3,4,6-tetrafluorophenyl) borate; N,N-dialkylanilinium tetrakis-(2,3,4,6-tetrafluorophenyl)borate; trialkylammonium tetrakis(perfluoronaphthyl)borate; N,N-dialkylanilinium tetrakis(perfluoronaphthyl)borate; trialkylammonium tetrakis(perfluorobiphenyl)borate; N,N-dialkylanilinium tetrakis(perfluorobiphenyl)borate; trialkylammonium tetrakis(3,5-bis(trifluoromethyl)phenyl) borate; N,N-dialkylanilinium tetrakis(3,5-bis(trifluoromethyl)phenyl)borate; N,N-dialkyl-(2,4,6-trimethylanilinium) tetrakis(3,5-bis(trifluoromethyl)phenyl)borate; and di-(i-propyl)ammonium tetrakis(pentafluorophenyl)borate; where alkyl is methyl, ethyl, propyl, n-butyl, sec-butyl, or t-butyl.

44. The process of claim 1 wherein alumoxane is present at zero mol %.

45. A process for polymerization comprising contacting ethylene and optionally one or more unsaturated monomers with an activator comprising a non-coordinating anion and a catalyst compound represented by the structure:

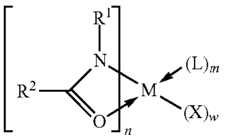

wherein M is a Group 4 transition metal;

N is nitrogen;

O is oxygen;

each X is, independently, selected from the group consisting of fluoride, chloride, bromide, iodide, methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, hydride, phenyl, benzyl, phenethyl, tolyl, trimethylsilylmethyl, bis(trimethylsilyl)methyl, methoxy, ethoxy, propoxy, butoxy, dimethylamido, diethylamido, methylethylamido, phenoxy, benzoxy, and allyl;

w is 1, 2 or 3;

each $R^1$ and $R^2$ is, independently, a hydrogen, a hydrocarbyl, a substituted hydrocarbyl, a halocarbyl, or a substituted halocarbyl, a halogen, an alkoxide, a sulfide, an amide, a phosphide, or a silyl; or independently, may join together to form a $C_4$ to $C_{62}$ cyclic or polycyclic ring structure;

n is 2 or 3 such that w+n=4;

additionally in the case where n>1, the ligands (defined to be the organic fragment containing $R^1$, $R^2$, N, and O) may be linked together to form a potentially tetradentate, dianionic ligand;

L is a neutral ligand bonded to M ; and m is 0, 1, or 2 and indicates the absence or presence of L, provided that when $R^2$ is tert-butyl, then $R^1$ is not 2,6-dimethylphenyl and X is not Cl, and provided that when $R^1$ is phenyl or substituted alkyl, then $R^2$ is not a $C_1$ to $C_4$ alkyl.

46. The process of claim 45 wherein M is Ti, Zr or Hf.

47. The process of claim 45 wherein L is a neutral ligand bonded to M that includes pyridine, acetonitrile, diethyl ether, tetrahydrofuran, dimethylaniline, trimethylamine, tributylamine, trimethylphosphine, triphenylphosphine, lithium chloride, ethylene, propylene, butene, octene, or styrene.

48. A process for polymerization comprising contacting ethylene and optionally one or more unsaturated monomers with an activator comprising a non-coordinating anion and a catalyst compound represented by the structure:

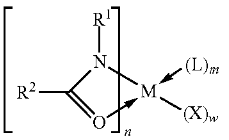

wherein M is a Group 4 transition metal

N is nitrogen;

O is oxygen;

each X is, independently, selected from the group consisting of fluoride, chloride, bromide, iodide, methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, hydride, phenyl, benzyl, phenethyl, tolyl, trimethylsilylmethyl, bis(trimethylsilyl)methyl, methoxy, ethoxy, propoxy, butoxy, dimethylamido, diethylamido, methylethylamido, phenoxy, benzoxy, and allyl;

w is 1, 2, or 3;

each $R^2$ is, independently, a hydrogen, a hydrocarbyl, a substituted hydrocarbyl, a halocarbyl, or a substituted halocarbyl, a halogen, an alkoxide, a sulfide, an amide, a phosphide, or a silyl; or independently, may join together to form a $C_4$ to $C_{62}$ cyclic or polycyclic ring structure;

each $R^1$ is, independently, selected from the group consisting of hydrogen, methyl, ethyl, propyl, butyl, pentyl, hexyl, heptyl, octyl, nonyl, decyl, undecyl, dodecyl, tridecyl, tetradecyl, octacosyl, nonacosyl, triacontyl, cyclohexyl, cyclopentyl, cycloheptyl, cyclooctyl, cyclodecyl, cyclododecyl, naphthyl, phenyl, tolyl, benzyl, phenethyl, dimethylphenol, diethylphenyl, anthracenvl, adamantyl, norbornyl, $CF_3$ $NO_2$ t-butyl, i-propyl, naphthyl, fluoride, trimethylphenyl, methylphenyl, ethylphenyl, diethylphenyl, triethylphenyl, propylphenyl, dipropylphenyl, diisopropyl phenyl, tripropylphenyl, isopropylphenyl, methylethyl phenyl, dibutylphenyl, butylphenyl, and pentafluorophenyl;

n is 1, 2, or 3 such that w+n=4;

additionally in the case where n>1, the ligands (defined to be the organic fragment containing $R^1$, $R^2$, N, and O) may be linked together to form a potentially tetradentate, dianionic ligand;

L is a neutral ligand bonded to M ; and m is 0, 1, or 2 and indicates the absence or presence of L, provided that when $R^2$ is tert-butyl, then $R^1$ is not 2,6-dimethylphenyl and X is not Cl, and provided that when $R^1$ is a substituted phenyl or adamantyl, then $R^2$ is not a $C_1$ to $C_6$ linear or branched alkyl.

* * * * *